US010726399B2

(12) United States Patent
Aaron et al.

(10) Patent No.: US 10,726,399 B2
(45) Date of Patent: *Jul. 28, 2020

(54) ITEM-LEVEL INFORMATION COLLECTION FOR INTERACTIVE PAYMENT EXPERIENCE

(71) Applicant: Square, Inc., San Francisco, CA (US)

(72) Inventors: Paul Aaron, San Francisco, CA (US); Zachary Brock, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 15/582,300

(22) Filed: Apr. 28, 2017

(65) Prior Publication Data

US 2018/0150807 A1 May 31, 2018

Related U.S. Application Data

(63) Continuation of application No. 14/329,658, filed on Jul. 11, 2014, now Pat. No. 9,652,751.

(Continued)

(51) Int. Cl.
*G06Q 50/00* (2012.01)
*G06Q 20/04* (2012.01)
(Continued)

(52) U.S. Cl.
CPC ......... *G06Q 20/0453* (2013.01); *G06Q 20/04* (2013.01); *G06Q 20/12* (2013.01);
(Continued)

(58) Field of Classification Search
None
See application file for complete search history.

(56) References Cited

U.S. PATENT DOCUMENTS 5,315,093 A 5/1994 Stewart
5,590,038 A 12/1996 Pitroda
(Continued)

FOREIGN PATENT DOCUMENTS

AU 2017235924 A1 10/2017
AU 2018205104 A1 7/2018
(Continued)

OTHER PUBLICATIONS

Munson, J., and Gupta, V.K., "Location-Based Notification as a General-Purpose Service," dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44.

(Continued)

*Primary Examiner* — Fateh M Obaid
(74) *Attorney, Agent, or Firm* — Lee & Hayes, P.C.

(57) ABSTRACT

Disclosed is a technology for collecting item-level transaction information for interactive payment experience. According to one embodiment, a merchant server can maintain a database including the information of financial accounts having a particular classification. The classification indicates that these financial accounts are associated with a payment service system. When the merchant server determines a requested financial transaction involves a financial account classified in the database, the merchant server transmits the item-level transaction information to the payment service system. The payment service system receives the item-level transaction information in real-time or near real-time and generates an interactive digital transaction receipt for a consumer.

5 Claims, 10 Drawing Sheets

Related U.S. Application Data

(60) Provisional application No. 62/000,251, filed on May 19, 2014.

(51) Int. Cl.
*G06Q 20/42* (2012.01)
*G06Q 20/32* (2012.01)
*G06Q 20/20* (2012.01)
*G06Q 20/40* (2012.01)
*G06Q 20/12* (2012.01)

(52) U.S. Cl.
CPC ......... *G06Q 20/202* (2013.01); *G06Q 20/204* (2013.01); *G06Q 20/322* (2013.01); *G06Q 20/40* (2013.01); *G06Q 20/42* (2013.01)

(56) References Cited

U.S. PATENT DOCUMENTS

| | | |
|---|---|---|
| 5,652,421 A | 7/1997 | Veeneman et al. |
| 5,878,337 A | 3/1999 | Joao et al. |
| 5,960,411 A | 9/1999 | Hartman et al. |
| 6,026,387 A | 2/2000 | Kesel |
| 6,076,079 A | 6/2000 | Boston et al. |
| 6,154,738 A | 11/2000 | Call |
| 6,263,352 B1 | 7/2001 | Cohen |
| 6,330,544 B1 | 12/2001 | Walker et al. |
| 6,341,353 B1 | 1/2002 | Herman et al. |
| 6,636,835 B2 | 10/2003 | Ragsdale-Elliott et al. |
| 7,010,495 B1 | 3/2006 | Samra et al. |
| 7,085,812 B1 | 8/2006 | Sherwood |
| 7,136,448 B1 | 11/2006 | Venkataperumal et al. |
| 7,155,411 B1 | 12/2006 | Blinn et al. |
| 7,233,843 B2 | 6/2007 | Budhraja et al. |
| 7,406,436 B1 | 7/2008 | Reisman |
| 7,475,024 B1 | 1/2009 | Phan |
| 7,478,054 B1 | 1/2009 | Adams et al. |
| 7,493,390 B2 | 2/2009 | Bobde et al. |
| 7,552,087 B2 | 6/2009 | Schultz et al. |
| 7,575,166 B2 | 8/2009 | McNamara |
| 7,580,873 B1 | 8/2009 | Silver et al. |
| 7,603,382 B2 | 10/2009 | Halt, Jr. |
| 7,764,185 B1 | 7/2010 | Manz et al. |
| D621,849 S | 8/2010 | Anzures et al. |
| 7,810,729 B2 | 10/2010 | Morley, Jr. |
| 7,818,809 B1 | 10/2010 | Sobel et al. |
| 8,060,259 B2 | 11/2011 | Budhraja et al. |
| 8,112,066 B2 | 2/2012 | Ben Ayed |
| 8,266,551 B2 | 9/2012 | Boldyrev et al. |
| 8,396,808 B2 | 3/2013 | Greenspan |
| 8,401,710 B2 | 3/2013 | Budhraja et al. |
| 8,423,459 B1 | 4/2013 | Green et al. |
| 8,434,682 B1 | 5/2013 | Argue et al. |
| D683,755 S | 6/2013 | Phelan |
| 8,498,888 B1 | 7/2013 | Raff et al. |
| 8,548,929 B1 | 10/2013 | Goodwin et al. |
| 8,571,916 B1 | 10/2013 | Bruce et al. |
| 8,577,810 B1 | 11/2013 | Dalit et al. |
| D695,306 S | 12/2013 | Gabouer et al. |
| 8,602,296 B1 | 12/2013 | Velline et al. |
| 8,630,586 B2 | 1/2014 | Dvortsov et al. |
| 8,645,014 B1 | 2/2014 | Kozlowski et al. |
| 8,676,119 B2 | 3/2014 | Cohen et al. |
| 8,682,806 B1 | 3/2014 | Cate et al. |
| 8,694,357 B2 | 4/2014 | Ting et al. |
| 8,843,385 B2 | 9/2014 | Jurca et al. |
| 8,855,312 B1 | 10/2014 | Hodgman et al. |
| 8,859,337 B2 | 10/2014 | Gaul et al. |
| 8,892,462 B1 * | 11/2014 | Borovsky ............ G06Q 20/204 705/17 |
| D720,765 S | 1/2015 | Xie et al. |
| D720,766 S | 1/2015 | Mandal et al. |
| D725,133 S | 3/2015 | Smirin et al. |
| D725,666 S | 3/2015 | Tseng et al. |
| 8,972,298 B2 | 3/2015 | Kunz et al. |
| D732,059 S | 6/2015 | Andersen et al. |
| 9,064,249 B1 | 6/2015 | Borovsky et al. |
| 9,195,985 B2 | 11/2015 | Domenica et al. |
| D748,114 S | 1/2016 | Leyon |
| D752,604 S | 3/2016 | Zhang |
| D752,605 S | 3/2016 | Wang |
| 9,542,681 B1 | 1/2017 | Borovsky et al. |
| D786,906 S | 5/2017 | Andersen et al. |
| 9,652,751 B2 | 5/2017 | Aaron et al. |
| 9,704,146 B1 | 7/2017 | Morgan et al. |
| 9,721,251 B1 | 8/2017 | Jen et al. |
| 9,799,021 B1 | 10/2017 | Lee |
| 10,026,062 B1 | 7/2018 | Sasmaz et al. |
| 10,217,092 B1 | 2/2019 | Maxwell et al. |
| 10,430,797 B1 | 10/2019 | Borovsky et al. |
| 2001/0054003 A1 | 12/2001 | Chien et al. |
| 2002/0091646 A1 | 7/2002 | Lake et al. |
| 2003/0014317 A1 | 1/2003 | Siegel et al. |
| 2003/0115126 A1 | 6/2003 | Pitroda |
| 2003/0115285 A1 | 6/2003 | Lee et al. |
| 2003/0204447 A1 | 10/2003 | Dalzell et al. |
| 2004/0030601 A1 | 2/2004 | Pond et al. |
| 2004/0103065 A1 | 5/2004 | Kishen et al. |
| 2004/0193489 A1 | 9/2004 | Boyd et al. |
| 2004/0197489 A1 | 10/2004 | Heuser et al. |
| 2004/0204990 A1 | 10/2004 | Lee et al. |
| 2004/0215520 A1 | 10/2004 | Butler et al. |
| 2004/0219971 A1 | 11/2004 | Ciancio et al. |
| 2005/0055582 A1 | 3/2005 | Bazakos et al. |
| 2005/0246245 A1 | 11/2005 | Satchell et al. |
| 2006/0064373 A1 | 3/2006 | Kelley |
| 2006/0085333 A1 | 4/2006 | Wah et al. |
| 2006/0261149 A1 | 11/2006 | Raghavendra Tulluri |
| 2007/0069013 A1 | 3/2007 | Seifert et al. |
| 2007/0073619 A1 | 3/2007 | Smith |
| 2007/0208930 A1 | 9/2007 | Blank et al. |
| 2007/0244766 A1 | 10/2007 | Goel |
| 2008/0035725 A1 | 2/2008 | Jambunathan et al. |
| 2008/0037442 A1 | 2/2008 | Bill |
| 2008/0040265 A1 | 2/2008 | Rackley, III et al. |
| 2008/0133351 A1 | 6/2008 | White et al. |
| 2008/0177624 A9 | 7/2008 | Dohse |
| 2008/0197188 A1 | 8/2008 | Jagatic et al. |
| 2008/0262925 A1 | 10/2008 | Kim et al. |
| 2008/0277465 A1 | 11/2008 | Pletz et al. |
| 2008/0296978 A1 | 12/2008 | Finkenzeller et al. |
| 2009/0070228 A1 | 3/2009 | Ronen |
| 2009/0106105 A1 | 4/2009 | Lewis et al. |
| 2009/0106138 A1 | 4/2009 | Smith et al. |
| 2009/0112766 A1 | 4/2009 | Hammad et al. |
| 2009/0159663 A1 | 6/2009 | Mullen et al. |
| 2009/0204472 A1 | 8/2009 | Einhorn |
| 2009/0240558 A1 | 9/2009 | Bandy et al. |
| 2009/0271265 A1 | 10/2009 | Lay et al. |
| 2009/0288012 A1 | 11/2009 | Hertel et al. |
| 2009/0313132 A1 | 12/2009 | McKenna et al. |
| 2009/0319421 A1 | 12/2009 | Mathis et al. |
| 2010/0076777 A1 | 3/2010 | Paretti et al. |
| 2010/0082420 A1 | 4/2010 | Trifiletti et al. |
| 2010/0125495 A1 | 5/2010 | Smith et al. |
| 2010/0174596 A1 | 7/2010 | Gilman et al. |
| 2010/0185514 A1 | 7/2010 | Glazer et al. |
| 2010/0217675 A1 | 8/2010 | Bookstaff |
| 2010/0217699 A1 | 8/2010 | Bookstaff |
| 2010/0223145 A1 | 9/2010 | Dragt |
| 2010/0269059 A1 | 10/2010 | Othmer et al. |
| 2010/0280896 A1 | 11/2010 | Postrel |
| 2010/0325048 A1 | 12/2010 | Carlson et al. |
| 2011/0029416 A1 | 2/2011 | Greenspan |
| 2011/0047013 A1 | 2/2011 | McKenzie, III |
| 2011/0055084 A1 | 3/2011 | Singh |
| 2011/0071892 A1 | 3/2011 | Dickelman |
| 2011/0087550 A1 | 4/2011 | Fordyce, III et al. |
| 2011/0106659 A1 | 5/2011 | Faith et al. |
| 2011/0112897 A1 | 5/2011 | Tietzen et al. |
| 2011/0145052 A1 | 6/2011 | Lin et al. |
| 2011/0178883 A1 | 7/2011 | Granbery et al. |
| 2011/0180598 A1 | 7/2011 | Morgan et al. |
| 2011/0196802 A1 | 8/2011 | Ellis et al. |

(56) References Cited

U.S. PATENT DOCUMENTS

| | | |
|---|---|---|
| 2011/0251892 A1 | 10/2011 | Laracey |
| 2011/0258014 A1 | 10/2011 | Evangelist et al. |
| 2011/0258689 A1 | 10/2011 | Cohen et al. |
| 2011/0295722 A1 | 12/2011 | Reisman |
| 2011/0302019 A1 | 12/2011 | Proctor, Jr. et al. |
| 2011/0302080 A1 | 12/2011 | White et al. |
| 2011/0313867 A9 | 12/2011 | Silver |
| 2011/0320345 A1 | 12/2011 | Taveau et al. |
| 2012/0005076 A1 | 1/2012 | Dessert et al. |
| 2012/0011072 A1 | 1/2012 | Lodolo |
| 2012/0016731 A1 | 1/2012 | Smith et al. |
| 2012/0029990 A1 | 2/2012 | Fisher |
| 2012/0030044 A1 | 2/2012 | Hurst |
| 2012/0059701 A1 | 3/2012 | van der Veen et al. |
| 2012/0059758 A1 | 3/2012 | Carlson |
| 2012/0066065 A1 | 3/2012 | Switzer |
| 2012/0084210 A1 | 4/2012 | Farahmand |
| 2012/0089418 A1 | 4/2012 | Kamath et al. |
| 2012/0095867 A1 | 4/2012 | McKelvey |
| 2012/0095871 A1 | 4/2012 | Dorsey et al. |
| 2012/0110568 A1 | 5/2012 | Abel et al. |
| 2012/0130785 A1 | 5/2012 | Postrel |
| 2012/0150611 A1 | 6/2012 | Isaacson et al. |
| 2012/0150742 A1 | 6/2012 | Poon et al. |
| 2012/0185306 A1 | 7/2012 | Cheng |
| 2012/0198279 A1 | 8/2012 | Schroeder |
| 2012/0209773 A1 | 8/2012 | Ranganathan |
| 2012/0244885 A1 | 9/2012 | Hefetz |
| 2012/0254031 A1 | 10/2012 | Walker et al. |
| 2012/0271725 A1 | 10/2012 | Cheng |
| 2012/0278727 A1 | 11/2012 | Ananthakrishnan et al. |
| 2012/0284036 A1 | 11/2012 | Evans |
| 2012/0290422 A1 | 11/2012 | Bhinder |
| 2012/0290484 A1 | 11/2012 | Maher |
| 2012/0290609 A1 | 11/2012 | Britt |
| 2012/0296679 A1 | 11/2012 | Im |
| 2012/0316941 A1 | 12/2012 | Moshfeghi |
| 2012/0323685 A1 | 12/2012 | Ullah |
| 2013/0006773 A1 | 1/2013 | Lutnick et al. |
| 2013/0024307 A1 | 1/2013 | Fuerstenberg et al. |
| 2013/0024341 A1 | 1/2013 | Jeon et al. |
| 2013/0030879 A1 | 1/2013 | Munjal et al. |
| 2013/0030889 A1 | 1/2013 | Davich et al. |
| 2013/0036065 A1 | 2/2013 | Chen et al. |
| 2013/0048719 A1 | 2/2013 | Bennett |
| 2013/0050080 A1 | 2/2013 | Dahl et al. |
| 2013/0054320 A1 | 2/2013 | Dorso et al. |
| 2013/0065672 A1 | 3/2013 | Gelman et al. |
| 2013/0066783 A1 | 3/2013 | Wolff |
| 2013/0073363 A1 | 3/2013 | Boal |
| 2013/0103574 A1 | 4/2013 | Conrad et al. |
| 2013/0103946 A1 | 4/2013 | Binenstock |
| 2013/0117329 A1 | 5/2013 | Bank et al. |
| 2013/0124333 A1 | 5/2013 | Doughty et al. |
| 2013/0124361 A1 | 5/2013 | Bryson |
| 2013/0132140 A1 | 5/2013 | Amin et al. |
| 2013/0132182 A1 | 5/2013 | Fung et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0151613 A1 | 6/2013 | Dhawan et al. |
| 2013/0159172 A1 | 6/2013 | Kim |
| 2013/0159446 A1 | 6/2013 | Carlson et al. |
| 2013/0166402 A1 | 6/2013 | Parento et al. |
| 2013/0179227 A1 | 7/2013 | Booth et al. |
| 2013/0191194 A1* | 7/2013 | Shreibati ............... G06Q 40/06 705/14.12 |
| 2013/0198018 A1 | 8/2013 | Baig |
| 2013/0204727 A1 | 8/2013 | Rothschild |
| 2013/0218721 A1 | 8/2013 | Borhan et al. |
| 2013/0225081 A1 | 8/2013 | Doss et al. |
| 2013/0236109 A1 | 9/2013 | Madden et al. |
| 2013/0246207 A1 | 9/2013 | Novak et al. |
| 2013/0246280 A1 | 9/2013 | Kirsch |
| 2013/0246301 A1 | 9/2013 | Radhakrishnan et al. |
| 2013/0268431 A1 | 10/2013 | Mohsenzadeh |
| 2013/0290173 A1 | 10/2013 | Nemeroff |
| 2013/0290522 A1 | 10/2013 | Behm, Jr. |
| 2013/0291018 A1 | 10/2013 | Billings et al. |
| 2013/0295882 A1 | 11/2013 | Zhao |
| 2013/0297933 A1 | 11/2013 | Fiducia et al. |
| 2013/0317835 A1 | 11/2013 | Mathew |
| 2013/0317886 A1 | 11/2013 | Kiran et al. |
| 2013/0317950 A1 | 11/2013 | Abraham et al. |
| 2013/0332385 A1 | 12/2013 | Kilroy et al. |
| 2013/0346223 A1 | 12/2013 | Prabhu et al. |
| 2014/0012754 A1 | 1/2014 | Hanson et al. |
| 2014/0019236 A1 | 1/2014 | Argue et al. |
| 2014/0025446 A1 | 1/2014 | Nagarajan et al. |
| 2014/0052613 A1 | 2/2014 | Tavakoli et al. |
| 2014/0057667 A1 | 2/2014 | Blankenship et al. |
| 2014/0058861 A1 | 2/2014 | Argue et al. |
| 2014/0059466 A1 | 2/2014 | Mairs et al. |
| 2014/0081853 A1 | 3/2014 | Sanchez et al. |
| 2014/0081854 A1 | 3/2014 | Sanchez et al. |
| 2014/0096179 A1 | 4/2014 | Ben-Shalom et al. |
| 2014/0099888 A1 | 4/2014 | Flanagan et al. |
| 2014/0100991 A1 | 4/2014 | Lenahan et al. |
| 2014/0108245 A1 | 4/2014 | Drummond et al. |
| 2014/0114781 A1 | 4/2014 | Watanabe |
| 2014/0122345 A1 | 5/2014 | Argue et al. |
| 2014/0129135 A1 | 5/2014 | Holden et al. |
| 2014/0129302 A1 | 5/2014 | Amin et al. |
| 2014/0129357 A1 | 5/2014 | Goodwin |
| 2014/0129951 A1 | 5/2014 | Amin et al. |
| 2014/0136318 A1 | 5/2014 | Alberth, Jr. et al. |
| 2014/0143157 A1 | 5/2014 | Jeffs et al. |
| 2014/0149239 A1 | 5/2014 | Argue et al. |
| 2014/0156508 A1 | 6/2014 | Argue et al. |
| 2014/0180805 A1 | 6/2014 | Argue et al. |
| 2014/0184505 A1 | 7/2014 | Fullerton et al. |
| 2014/0207669 A1 | 7/2014 | Rosenberg |
| 2014/0207680 A1 | 7/2014 | Rephlo |
| 2014/0236762 A1 | 8/2014 | Gerber et al. |
| 2014/0244462 A1 | 8/2014 | Maenpaa et al. |
| 2014/0244489 A1 | 8/2014 | Kessler et al. |
| 2014/0249947 A1 | 9/2014 | Hicks et al. |
| 2014/0254820 A1 | 9/2014 | Gardenfors et al. |
| 2014/0257958 A1 | 9/2014 | Andrews |
| 2014/0278589 A1 | 9/2014 | Rados et al. |
| 2014/0279184 A1 | 9/2014 | Lai et al. |
| 2014/0344102 A1 | 11/2014 | Cooper |
| 2014/0351004 A1 | 11/2014 | Flett |
| 2014/0379497 A1 | 12/2014 | Varma et al. |
| 2014/0379536 A1 | 12/2014 | Varma et al. |
| 2014/0379580 A1 | 12/2014 | Varma et al. |
| 2015/0025983 A1 | 1/2015 | Cicerchi |
| 2015/0066699 A1 | 3/2015 | Fisher |
| 2015/0073989 A1 | 3/2015 | Green et al. |
| 2015/0095134 A1 | 4/2015 | Parker et al. |
| 2015/0112838 A1 | 4/2015 | Li et al. |
| 2015/0134439 A1 | 5/2015 | Maxwell et al. |
| 2015/0142514 A1 | 5/2015 | Tutte |
| 2015/0187021 A1 | 7/2015 | Moring et al. |
| 2015/0294312 A1 | 10/2015 | Kendrick et al. |
| 2015/0304270 A1 | 10/2015 | Cook |
| 2015/0332223 A1* | 11/2015 | Aaron ............... G06Q 20/42 705/39 |
| 2018/0032997 A1 | 2/2018 | Gordon et al. |
| 2020/0034801 A1 | 1/2020 | Maxwell et al. |

FOREIGN PATENT DOCUMENTS

| | | |
|---|---|---|
| CA | 2 916 603 A1 | 12/2014 |
| CA | 2 930 186 A1 | 5/2015 |
| GB | 2530451 A | 3/2016 |
| KR | 10-2006-0103089 A | 9/2006 |
| WO | 2011/014875 A1 | 2/2011 |
| WO | 2014/210020 A1 | 12/2014 |
| WO | 2015/069389 A1 | 5/2015 |

(56) References Cited

FOREIGN PATENT DOCUMENTS

WO    2015/100378 A1    7/2015
WO    2015/179316 A1    11/2015

OTHER PUBLICATIONS

Final Office Action dated Oct. 19, 2018, for U.S. Appl. No. 14/088,113, of Maxwell, D.W., et al., filed Nov. 22, 2013.
Notice of Allowance dated Oct. 30, 2018, for U.S. Appl. No. 14/088,141, of Maxwell, D.W., et al., filed Nov. 22, 2013.
Non-Final Office Action dated Nov. 14, 2018, for U.S. Appl. No. 15/339,794, of Borovsky, A., et al., filed Oct. 31, 2016.
Examiner Requisition for Canadian Patent Application No. 2,930,186, dated Nov. 28, 2018.
Non-Final Office Action dated Jan. 14, 2019, for U.S. Appl. No. 14/088,113, of Maxwell, D.W., et al., filed Nov. 22, 2013.
Final Office Action dated Feb. 26, 2019, for U.S. Appl. No. 14/220,064, of Maxwell, D.W., et al., filed Mar. 19, 2014.
"Another eBay Band-Aid Fails to Fix the New Pricing Structure Flaws," posted on Oct. 18, 2008, Retrieved from the Internet URL: https://thebrewsnews.wordpress.com/2008/10/18/another-ebay-band-aid-fails-to-fix-the-new-pricing-structure-flaws/, pp. 1-4.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Merchantindustry.com-Best Merchant Services," Retrieved from internet URL: https://web.archive.org/web/20121020212419/http://www.merchantindustry.com/, on Dec. 30, 2015, pp. 1-7.
"Online Shopping," dated Nov. 2, 2014, Retrieved from the Internet URL: http://en.wikipedia.org/wiki/Online_shopping, on Nov. 10, 2014, pp. 1-12.
"Payment Gateway," Wikipedia, published May 30, 2014, Retrieved from the Internet URL: http://en.wikipedia.org/wiki/Pavment gateways, on Jun. 6, 2014, pp. 1-3.
"ProPay JAK Mobile Card Reader," Propay, published Dec. 27, 2011, Retrieved from the Internet URL: https://web.archive.org/web/20111227055421/https://www.propay.com/products-services/accept-payments/jak-card-reader, pp. 1-2.
"Tracking Inventory," PayPal, dated Jan. 4, 2010, Retrieved from the Internet URL: https://www.paypal-community.com/t5/How-to-use-PayPal-Archive/Tracking-inventory/td-p/19392, pp. 1-3.
"Verified by Visa Acquirer and Merchant Implementation Guide," U.S. Region, Visa Public, May, 2011, pp. 1-114.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
Punch, L., "E-commerce: Just what does card-present mean these days," dated Oct. 1, 2012, Retrieved from the Internet URL: http://digitaltransactions.net/news/ story/ E-Commerce_-Just-What-Does-Card-Present-Mean-These-Days, on Feb. 17, 2015, pp. 1-4.
Shalmanese, "The Straight Dope Message Board," message dated Oct. 5, 2013, Retrieved from the Internet URL: http://boards.straightdope.com/sdmb/showthread.php?t=703989%BB, on Jul. 18, 2016, pp. 1-10.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.

Non-Final Office Action dated Apr. 10, 2014, for U.S. Appl. No. 14/160,490, of Moring, D., et al., filed Jan. 21, 2014.
Non-Final Office Action dated May 29, 2014, for U.S. Appl. No. 13/837,562, of Chin, H.C.A., et al., filed Mar. 15, 2013.
Non-Final Office Action dated Aug. 27, 2014, for U.S. Appl. No. 14/165,256, of Aaron, P., filed Jan. 27, 2014.
Final Office Action dated Aug. 28, 2014, for U.S. Appl. No. 14/160,490, of Moring, D., et al., filed Jan. 21, 2014.
Advisory Action dated Nov. 18, 2014, for U.S. Appl. No. 14/160,490, of Moring, D., et al., filed Jan. 21, 2014.
Non-Final Office Action dated Dec. 1, 2014, for U.S. Appl. No. 14/062,617, of Templeton, T., et al., filed Oct. 24, 2013.
Non Final Office Action dated Dec. 15, 2014, for U.S. Appl. No. 14/312,397, of Varma, A.K., et al., filed Jun. 23, 2014.
Final Office Action dated Jan. 26, 2015, for U.S. Appl. No. 13/837,562, of Chin, H.C.A., et al., filed Mar. 15, 2013.
Notice of Allowance dated Feb. 20, 2015, for U.S. Appl. No. 14/513,076, of Borovsky, A., et al., filed Oct. 13, 2014.
Final Office Action dated Mar. 17, 2015, for U.S. Appl. No. 14/165,256, of Aaron, P., filed Jan. 27, 2014.
Non-Final Office Action dated Mar. 19, 2015, for U.S. Appl. No. 14/329,638, of Aaron, P., et al., filed Jul. 11, 2014.
Final Office Action dated Apr. 16, 2015, for U.S. Appl. No. 14/062,617, of Templeton, T., et al., filed Oct. 24, 2013.
Non-Final Office Action dated May 20, 2015, for U.S. Appl. No. 13/829,080, of Morgan, T.B., et al., filed Mar. 14, 2013.
Non-Final Office Action dated Jun. 11, 2015, for U.S. Appl. No. 14/692,655, of Borovsky, A., et al., filed Apr. 21, 2015.
Final Office Action dated Aug. 31, 2015, for U.S. Appl. No. 14/312,397, of Varma, A.K., et al., filed Jun. 23, 2014.
Final Office Action dated Sep. 17, 2015, for U.S. Appl. No. 13/829,080, of Morgan, T.B., et al., filed Mar. 14, 2013.
Non-Final Office Action dated Oct. 5, 2015, for U.S. Appl. No. 13/829,658, of Morgan, T.B., et al., filed Mar. 14, 2013.
Non-Final Office Action dated Oct. 6, 2015, for U.S. Appl. No. 14/329,658, of Aaron, P., et al. filed Jul. 11, 2014.
Non-Final Office Action dated Oct. 8, 2015, for U.S. Appl. No. 14/165,256, of Aaron, P., filed Jan. 27, 2014.
Final Office Action dated Oct. 16, 2015, for U.S. Appl. No. 14/692,655, of Borovsky, A., et al., filed Apr. 21, 2015.
Final Office Action dated Oct. 21, 2015, for U.S. Appl. No. 14/329,638, of Aaron, P., et al. filed Jul. 11, 2014.
Non-Final Office Action dated Nov. 18, 2015, for U.S. Appl. No. 14/182,655, of Spindel, N., et al., filed Feb. 18, 2014.
Advisory Action dated Nov. 24, 2015, for U.S. Appl. No. 13/829,080, of Morgan, T.B., et al., filed Mar. 14, 2013.
Advisory Action dated Dec. 30, 2015, for U.S. Appl. No. 14/692,655, of Borovsky, A., et al., filed Apr. 21, 2015.
Non-Final Office Action dated Jan. 14, 2016, for U.S. Appl. No. 14/312,397, of Varma, A.K., et al., filed Jun. 23, 2014.
Non-Final Office Action dated Feb. 2, 2016, for U.S. Appl. No. 13/829,080, of Morgan, T.B., et al., filed Mar. 14, 2013.
Non-Final Office Action dated Feb. 23, 2016, for U.S. Appl. No. 14/062,617, of Templeton, T., et al., filed Oct. 24, 2013.
Non-Final Office Action dated Mar. 14, 2016, for U.S. Appl. No. 14/692,655, of Borovsky, A., et al., filed Apr. 21, 2015.
Final Office Action dated Apr. 13, 2016, for U.S. Appl. No. 14/165,256, of Aaron, P., filed Jan. 27, 2014.
Final Office Action dated Apr. 27, 2016, for U.S. Appl. No. 14/182,655, of Spindel, N., et al., filed Feb. 18, 2014.
Non-Final Office Action dated May 3, 2016, for U.S. Appl. No. 13/830,350, of Morgan, T.B., et al., filed Mar. 14, 2013.
Non-Final Office Action dated May 5, 2016, for U.S. Appl. No. 14/312,397, of Varma, A.K., et al., filed Jun. 23, 2014.
Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D.W., et al., filed Nov. 22, 2013.
Non-Final Office Action dated Jun. 8, 2016, for U.S. Appl. No. 14/088,141, of Maxwell, D.W., et al., filed Nov. 22, 2013.
Final Office Action dated Jun. 20, 2016, for U.S. Appl. No. 13/829,658, of Morgan, T.B., et al., filed Mar. 14, 2013.

(56) References Cited

OTHER PUBLICATIONS

Final Office Action dated Aug. 10, 2017, for U.S. Appl. No. 14/160,490, of Moring, D., et al., filed Jan. 21, 2014.
Final Office Action dated Sep. 15, 2017, for U.S. Appl. No. 14/182,655, of Spindel, N., et al., filed Feb. 18, 2014.
Examination Report No. 2 for Australian Patent Application No. 2014302661, dated Sep. 26, 2017.
Advisory Action dated Oct. 31, 2017, for U.S. Appl. No. 14/160,490, of Moring, D., et al., filed Jan. 21, 2014.
Final Office Action dated Nov. 17, 2017, for U.S. Appl. No. 14/730,860, of Sasmaz, Y., et al., filed Jun. 4, 2015.
Notice of Allowance dated Nov. 24, 2017, for U.S. Appl. No. 13/829,658, of Morgan, T.B., et al., filed Mar. 14, 2013.
Non-Final Office Action dated Dec. 13, 2017, for U.S. Appl. No. 14/312,397, of Varma, A.K., et al., filed Jun. 23, 2014.
Non-Final Office Action dated Dec. 29, 2017, for U.S. Appl. No. 14/165,256, of Aaron, P., filed Jan. 27, 2014.
Examiner's Requisition for Canadian Patent Application No. 2,930,186, dated Jan. 11, 2018.
Final Office Action dated Jan. 22, 2018, for U.S. Appl. No. 13/830,350, of Morgan, T.B., et al., filed Mar. 14, 2013.
Examiner's Requisition for Canadian Patent Application No. 2,916,603, dated Feb. 15, 2018.
Bruene, J., "Capital One Add Rewards to Mobile App, Includes Ability to Redeem from Previous Travel," netbanker.com, published Apr. 20, 2012, Retrieved from the Internet URL: https://web.archive.org/web/20120425043052/http://www.netbanker.com/2012/04/capital_one_add_rewards_to_mobile_app_includes_ability_to_redeem_for_previous_travel.html, on Aug. 10, 2018, pp. 1-2.
Joy, "Square Wallet—an iOS App updated to send gift cards," Top Apps, dated Apr. 6, 2013, Retrieved from the Internet URL: http://www.topapps.net/apple-ios/square-wallet-an-ios-app-updated-to-send-gift-cards.html/, pp. 1-3.
Konrad, J., "A Traveler's Review of the Capital One Venture Rewards Card," Runaway truck, dated on Jul. 11, 2013, Retrieved from the Internet URL: http://web.archive.org/web/20130923122057/http://queenofsubtle.com/rt/travel-tips/a-travelers-review-of-the-capital-one-venture-rewards-card, pp. 1-2.
Non-Final Office Action dated Apr. 4, 2014, for U.S. Appl. No. 14/172,842, of Borovsky, A., et al., filed Feb. 4, 2014.
Notice of Allowance dated Aug. 1, 2014, for U.S. Appl. No. 14/172,842, of Borovsky, A., et al., filed Feb. 4, 2014.
Non-Final Office Action dated Mar. 3, 2015, for U.S. Appl. No. 14/506,534, of Aaron, P., et al., filed Oct. 3, 2014.
Final Office Action dated Jun. 24, 2015, for U.S. Appl. No. 14/506,534, of Aaron, P., et al., filed Oct. 3, 2014.
Non-Final Office Action dated Apr. 8, 2016, for U.S. Appl. No. 14/187,104, of Lee, R., filed Feb. 21, 2014.
Non-Final Office Action dated May 17, 2016, for U.S. Appl. No. 29/530,241, of Andersen, R., et al., filed Jun. 15, 2015.
Final Office Action dated Oct. 5, 2016, for U.S. Appl. No. 29/530,241, of Andersen, R., et al., filed Jun. 15, 2015.
Non-Final Office Action dated Dec. 7, 2016, for U.S. Appl. No. 14/187,104, of Lee, R., filed Feb. 21, 2014.
Notice of Allowance dated Jan. 3, 2017, for U.S. Appl. No. 29/530,241, of Andersen, R., et al., filed Jun. 15, 2015.
Non-Final Office Action dated Mar. 1, 2017, for U.S. Appl. No. 14/220,064, of Maxwell, D.W., et al., filed Mar. 19, 2014.
Notice of Allowance dated Jun. 21, 2017, for U.S. Appl. No. 14/187,104, of Lee, R., filed Feb. 21, 2014.
Final Office Action dated Sep. 20, 2017, for U.S. Appl. No. 14/220,064, of Maxwell, D.W., et al., filed Mar. 19, 2014.
Notice of Allowance dated Mar. 15, 2018, for U.S. Appl. No. 14/730,860, of Sasmaz, Y., et al., filed Jun. 4, 2015.
Non-Final Office Action dated Apr. 5, 2018, for U.S. Appl. No. 14/088,113, of Maxwell, D.W., et al., filed Nov. 22, 2013.
Non-Final Office Action dated Apr. 18, 2018, for U.S. Appl. No. 14/088,141, of Maxwell, D.W., et al., filed Nov. 22, 2013.
Examination Report No. 2 for Australian Patent Application No. 2015264426, dated Jun. 20, 2018.

Non-Final Office Action dated Aug. 3, 2018, for U.S. Appl. No. 14/220,064, of Maxwell, D.W., et al., filed Mar. 19, 2014.
Non-Final Office Action dated Jul. 14, 2016, for U.S. Appl. No. 14/160,490, of Moring, D., et al., filed Jan. 21, 2014.
Non-Final Office Action dated Jul. 21, 2016, for U.S. Appl. No. 14/329,638, of Aaron, P., et al., filed Jul. 11, 2014.
Non-Final Office Action dated Aug. 10, 2016, for U.S. Appl. No. 14/312,433, of Varma, A.K., et al., filed Jun. 23, 2014.
Final Office Action dated Sep. 1, 2016, for U.S. Appl. No. 14/062,617, of Templeton, T., et al., filed Oct. 24, 2013.
Non-Final Office Action dated Sep. 8, 2016, for U.S. Appl. No. 14/312,371, of Varma, A.K., et al., filed Jun. 23, 2014.
Notice of Allowance dated Sep. 13, 2016, for U.S. Appl. No. 14/692,655, of Borovsky, A., et al., filed Apr. 21, 2015.
Advisory Action dated Sep. 21, 2016, for U.S. Appl. No. 13/829,658, of Morgan, T.B., et al., filed Mar. 14, 2013.
Non-Final Office Action dated Sep. 22, 2016, for U.S. Appl. No. 14/182,655, of Spindel, N., et al., filed Feb. 18, 2014.
Examination Report No. 1 for Australian Patent Application No. 2014302661, dated Sep. 27, 2016.
Advisory Action dated Sep. 29, 2016, for U.S. Appl. No. 14/329,658, of Aaron, P., et al., filed Jul. 11, 2014.
Final Office Action dated Oct. 11, 2016, for U.S. Appl. No. 13/829,080, of Morgan, T.B., et al., filed Mar. 14, 2013.
Final Office Action dated Nov. 1, 2016, for U.S. Appl. No. 14/160,490, of Moring, D., et al., filed Jan. 21, 2014.
Final Office Action dated Nov. 10, 2016, for U.S. Appl. No. 13/830,350, of Morgan, T.B., et al., filed Mar. 14, 2013.
Non-Final Office Action dated Nov. 17, 2016, for U.S. Appl. No. 14/701,571, of Jen, M., et al., filed May 1, 2015.
Advisory Action dated Nov. 28, 2016, for U.S. Appl. No. 14/062,617, of Templeton, T., et al., filed Oct. 24, 2013.
Final Office Action dated Nov. 28, 2016, for U.S. Appl. No. 14/312,397, of Varma, A.K., et al., filed Jun. 23, 2014.
Final Office Action dated Nov. 29, 2016, for U.S. Appl. No. 14/088,113, of Maxwell, D.W., et al., filed Nov. 22, 2013.
Final Office Action dated Dec. 12, 2016, for U.S. Appl. No. 14/088,141, of Maxwell, D.W., et al., filed Nov. 22, 2013.
Examination Report No. 1 for Australian Patent Application No. 2014347192, dated Dec. 15, 2016.
Notice of Allowance dated Jan. 13, 2017, for U.S. Appl. No. 14/329,658, of Aaron, P., et al., filed Jul. 11, 2014.
Final Office Action dated Jan. 27, 2017, for U.S. Appl. No. 14/329,638, of Aaron, P., et al., filed Jul. 11, 2014.
Examiner's Requisition for Canadian Patent Application No. 2,930,186, dated Jan. 30, 2017.
Examiner's Requisition for Canadian Patent Application No. 2,916,603, dated Feb. 9, 2017.
Notice of Acceptance for Australian Patent Application No. 2014347192, dated Feb. 16, 2017.
Corrected Notice of Allowance dated Feb. 27, 2017, for U.S. Appl. No. 14/329,658, of Aaron, P., et al., filed Jul. 11, 2014.
Notice of Allowance dated Mar. 2, 2017, for U.S. Appl. No. 13/829,080, of Morgan, T.B., et al., filed Mar. 14, 2013.
Non-Final Office Action dated Mar. 15, 2017, for U.S. Appl. No. 13/829,658, of Morgan, T.B., et al., filed Mar. 14, 2013.
Notice of Allowance dated Mar. 23, 2017, for U.S. Appl. No. 14/701,571, of Jen, M., et al., filed May 1, 2015.
Advisory Action dated Apr. 10, 2017, for U.S. Appl. No. 14/312,397, of Varma, A.K., et al., filed Jun. 23, 2014.
Non-Final Office Action dated Apr. 18, 2017, for U.S. Appl. No. 14/160,490, of Moring, D., et al., filed Jan. 21, 2014.
Final Office Action dated Apr. 19, 2017, for U.S. Appl. No. 14/312,433, of Varma, A.K., et al., filed Jun. 23, 2014.
Final Office Action dated Apr. 27, 2017, for U.S. Appl. No. 14/312,371, of Varma, A.K., et al., filed Jun. 23, 2014.
Non-Final Office Action dated Jun. 19, 2017, for U.S. Appl. No. 14/730,860, of Sasmaz, Y., et al., filed Jun. 4, 2015.
Advisory Action dated Jun. 30, 2017, for U.S. Appl. No. 14/312,433, of Varma, A.K., et al., filed Jun. 23, 2014.
Non-Final Office Action dated Jul. 10, 2017, for U.S. Appl. No. 13/830,350, of Morgan, T.B., et al., filed Mar. 14, 2013.

(56) References Cited

OTHER PUBLICATIONS

Advisory Action dated Jul. 11, 2017, for U.S. Appl. No. 14/312,371, of Varma, A.K., et al., filed Jun. 23, 2014.
Examination Report No. 1 for Australian Patent Application No. 2015264426, dated Jul. 11, 2017.
International Search Report and Written Opinion for International Application No. PCT/US2014/043891, dated Dec. 10, 2014.
International Search Report and Written Opinion for International Application No. PCT/US2014/058398, dated Dec. 24, 2014.
International Search Report and Written Opinion for International Application No. PCT/US2014/072269, dated Mar. 31, 2015.
International Search Report and Written Opinion for International Application No. PCT/US2015/031423, dated Aug. 13, 2015.
Advisory Action dated Apr. 26, 2019, for U.S. Appl. No. 14/220,064, of Maxwell, D.W., et al., filed Mar. 19, 2014.
Notice of Allowance dated May 8, 2019, for U.S. Appl. No. 15/339,794, of Borovsky, A., et al., filed Oct. 31, 2016.
Final Office Action dated May 16, 2019, for U.S. Appl. No. 14/088,113 of Maxwell, D.W., et al., filed Nov. 22, 2013.
Advisory Action dated Jul. 25, 2019, for U.S. Appl. No. 14/088,113, of Maxwell, D.W., et al., filed Nov. 22, 2013.
Non-Final Office Action dated Sep. 17, 2019, for U.S. Appl. No. 14/220,064, of Maxwell, D.W., et al., filed Mar. 19, 2014.
Examination Report No. 1 for Australian Patent Application No. 2018205104, dated Sep. 10, 2019.
Non-Final Office Action dated Jan. 2, 2020, for U.S. Appl. No. 16/021,194, of Sasmaz, Y., et al., filed Jun. 28, 2018.
Examination Report No. 2 for Australian Patent Application No. 2018205104, dated Dec. 10, 2019.
Notice of Allowance for Canadian Patent Application No. 2,930,186 dated Jan. 16, 2020.
Final Office Action dated Mar. 13, 2020, for U.S. Appl. No. 14/220,064, of Maxwell, D.W., et al., filed Mar. 19, 2014.

* cited by examiner

ITEM-LEVEL INFORMATION COLLECTION FOR INTERACTIVE PAYMENT EXPERIENCE

CROSS REFERENCE TO RELATED PATENT APPLICATIONS

This application is a continuation of and claims priority to U.S. patent application Ser. No. 14/329,658, entitled "ITEM-LEVEL INFORMATION COLLECTION FOR INTERACTIVE PAYMENT EXPERIENCE" filed on Jul. 11, 2014 which application claims the benefit of U.S. Provisional Patent Application No. 62/000,251, entitled "TRANSACTION INFORMATION COLLECTION FOR MOBILE PAYMENT EXPERIENCE", which was filed on May 19, 2014, which are incorporated by reference herein in their entireties.

BACKGROUND

The traditional manner of providing receipts for payment transactions using financial accounts (e.g., credit cards and debit cards) is to print the payment amount and the purchased goods or services on a paper receipt. For instance, when a consumer wishes to pay for an item at a merchant's place of business by using a credit card, the consumer typically runs the credit card through a card reader at the merchant's point-of-sale (POS) terminal. The merchant's POS terminal submits a transaction request to an acquirer. The merchant typically stores all of the day's authorized transactions in a batch, and sends the batch to the acquirer at the end of the day to receive payment. The acquirer sends the batch to a card network (e.g., VISA or MasterCard), which distributes the transactions to credit card issuers. The credit card issuers authorize the transactions and then transfer the transaction amounts to one or more financial accounts of the merchant.

After a transaction has been authorized, the credit card issuer sends a confirmation to the POS terminal along a path opposite to that described above. The POS terminal prints out a paper receipt listing the purchases made, the method of payment, and the prices including tax, discounts and other price adjustments. The paper receipt serves as a proof of the purchase for the consumer.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
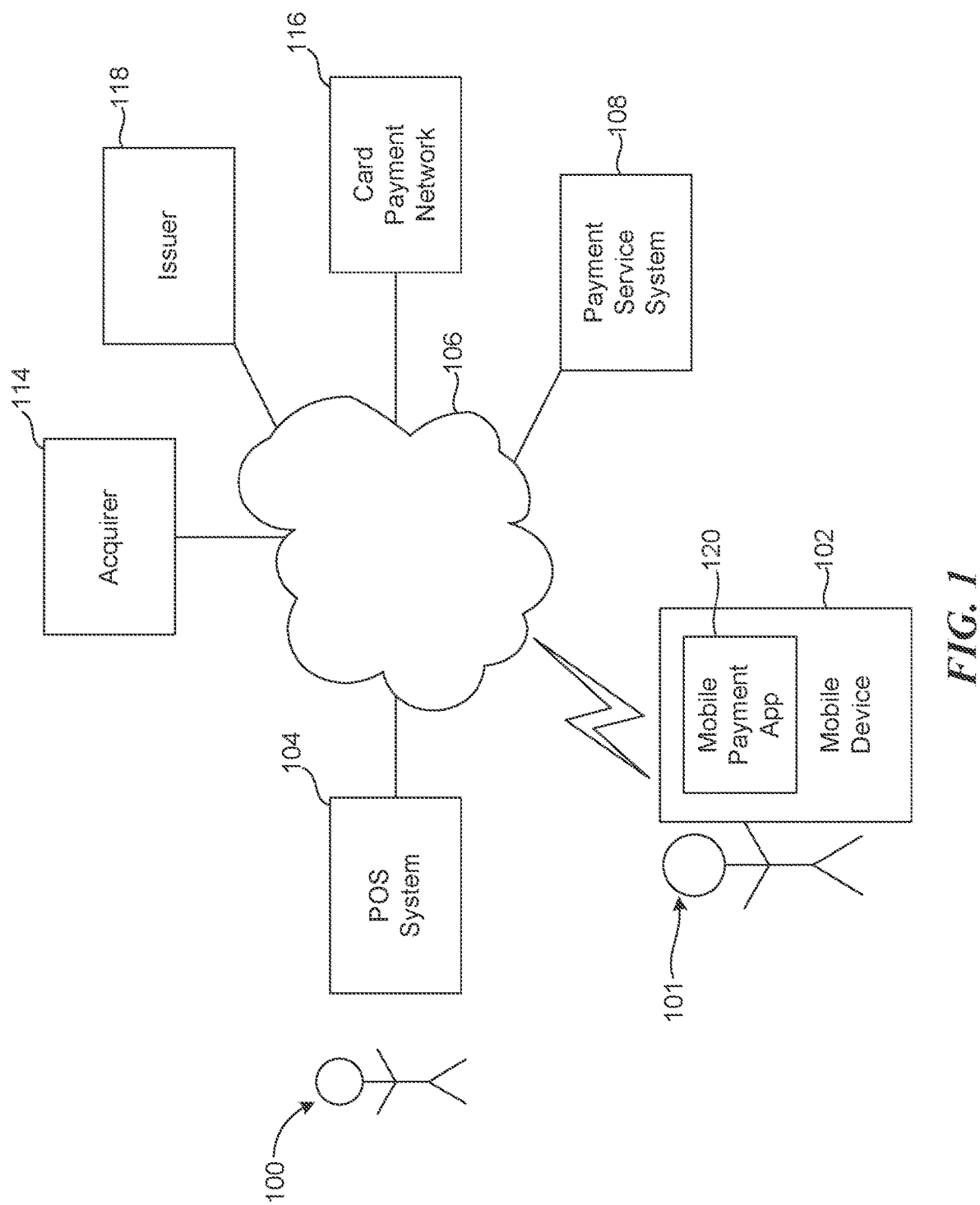
FIG. 1 illustrates an environment in which an interactive payment experience technique can be implemented.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here is technology that enables consumers to interact with digital transaction receipts (also referred to as interactive digital receipts) received by their mobile devices. According to one embodiment, a payment service system receives transaction information from a card payment network. Using the received transaction information, the payment service system generates a digital transaction receipt that is designed to interact with the consumer. A mobile device of the consumer receives the digital transaction receipt via a wireless network and displays it to the consumer. The consumer can interact with the digital transaction receipt in any of various ways, such as specifying tip amount, entering feedback, confirming the transaction, etc.

In some embodiments, the payment service system can receive transaction information from different entities involved in processing the payment transaction. For example, the payment service system may receive transaction information from the merchant, the acquirer or the issuer. In order to identify the financial accounts that require transaction information collection, the entity supplying the transaction information (e.g., a card payment network) can maintain a database including information of financial accounts having a particular classification (e.g., accounts that are known to be associated with the payment service system). When the entity determines that a requested financial transaction relates to a financial account so classified in the database, the entity transmits the transaction information to the payment service system in real-time or near real-time, so that the payment service system can generate an interactive digital transaction receipt for the consumer.

The payment service system can receive messages indicative that a consumer chooses to enroll his or her financial accounts for the interactive payment service. Accordingly the payment service system can send instructions to an entity supplying transaction information (e.g., the card payment network) to adjust the database which identifies financial accounts.

In some embodiments, a merchant server can maintain a database including the information of financial accounts having a particular classification. The classification indicates that these financial accounts are associated with the payment service system. When the merchant server determines a requested financial transaction involves a financial account classified in the database, the merchant server transmits the item-level transaction information to the payment service system. The payment service system receives the item-level transaction information in real-time or near real-time and generates an interactive digital transaction receipt for the consumer.

FIG. 1 illustrates an environment in which the interactive payment experience technique introduced here can be implemented. The environment includes a merchant POS system of a merchant 100 and a mobile device 102 of a user 101 (also referred to as "customer" or "consumer"). The mobile device 102 can be, for example, a smart phone, tablet computer, notebook computer, or any other form of mobile processing device. A mobile payment application 120 runs on the user's mobile device 102. The environment also includes a computer system 114 of the merchant's acquirer, a computer system 118 of an issuing bank, a computer system 116 of a card payment network, and a computer system 108 of a payment service (hereinafter "payment service system 108"). The payment service system can be operated by an interactive payment experience service provider. The merchant's acquirer is a bank or financial institution that processes payments (e.g., credit or debit card payments) on behalf of a merchant. The acquirer acquires the payments from an issuer. The issuer (or issuing bank) is a bank or financial institution that offered a financial account (e.g., credit or debit card account) to the user 101. The issuer issues payments to the acquirer on behalf of the user 101 (consumer).

Each of the aforementioned computer systems can include one or more distinct physical computers and/or other processing devices which, in the case of multiple devices, can be connected to each other through one or more wired and/or wireless networks. All of the aforementioned devices are coupled to each other through an internetwork 106, which can be or include the Internet and one or more wireless networks (e.g., a WiFi network and or a cellular telecommunications network).

The environment illustrated in FIG. 1 can accommodate both traditional payment card transactions (i.e., those involving reading of physical card of the customer at the merchant's location), as well as card-not-present (CNP) transactions (i.e., those where the card is not physically presented at the time that the payment is effected). In a traditional credit card transaction, for example, the merchant swipes the user's credit card through a card reader at the POS system 104. The term "swipe" here refers to any manner of triggering a card reader to read data from a card, such as by passing a card into or through a magnetic stripe card reader, optical scanner, smartcard (card with an embedded IC chip) reader (e.g., an EMV-compliant card reader), radio frequency identification (RFID) reader, or the like. The POS system 104 sends data read from the card (e.g., the cardholders name, credit card number, expiration date and card verification value (CVV)) to the computer system 114 of the merchant's acquirer (hereinafter "acquirer 114"). The acquirer 114 sends this data to the computer system 116 of the card payment network (e.g., Visa or MasterCard) (hereinafter "card payment network 116"), which forwards the data to the computer system 118 of the issuing bank (hereinafter "issuer 118"). If the transaction is approved by the issuer 118, a payment authorization message is sent from the issuer 118 to the merchant POS system 104 via a path opposite of that described above.

In a card-not-present transaction, for example, the consumer places an online order by transmitting the data of a credit card from the mobile device 102 to the POS system 104. The POS system 104 can include, e.g., a web server for receiving the online order information. Then the POS system 104 sends the data of the card to the acquirer 114. The acquirer 114, the issuer 118 and the card payment network 116 complete the transaction in a way similar to the traditional credit card transaction.

The payment service system 108 includes one or more server computers programmed to collect transaction information, and to provide interactive user interface based on the collected information. The payment service system 108 can collect the transaction information from various parties, such as the POS system 104, the acquirer 114, the issuer 118 and the card payment network 116.

Figure 2:
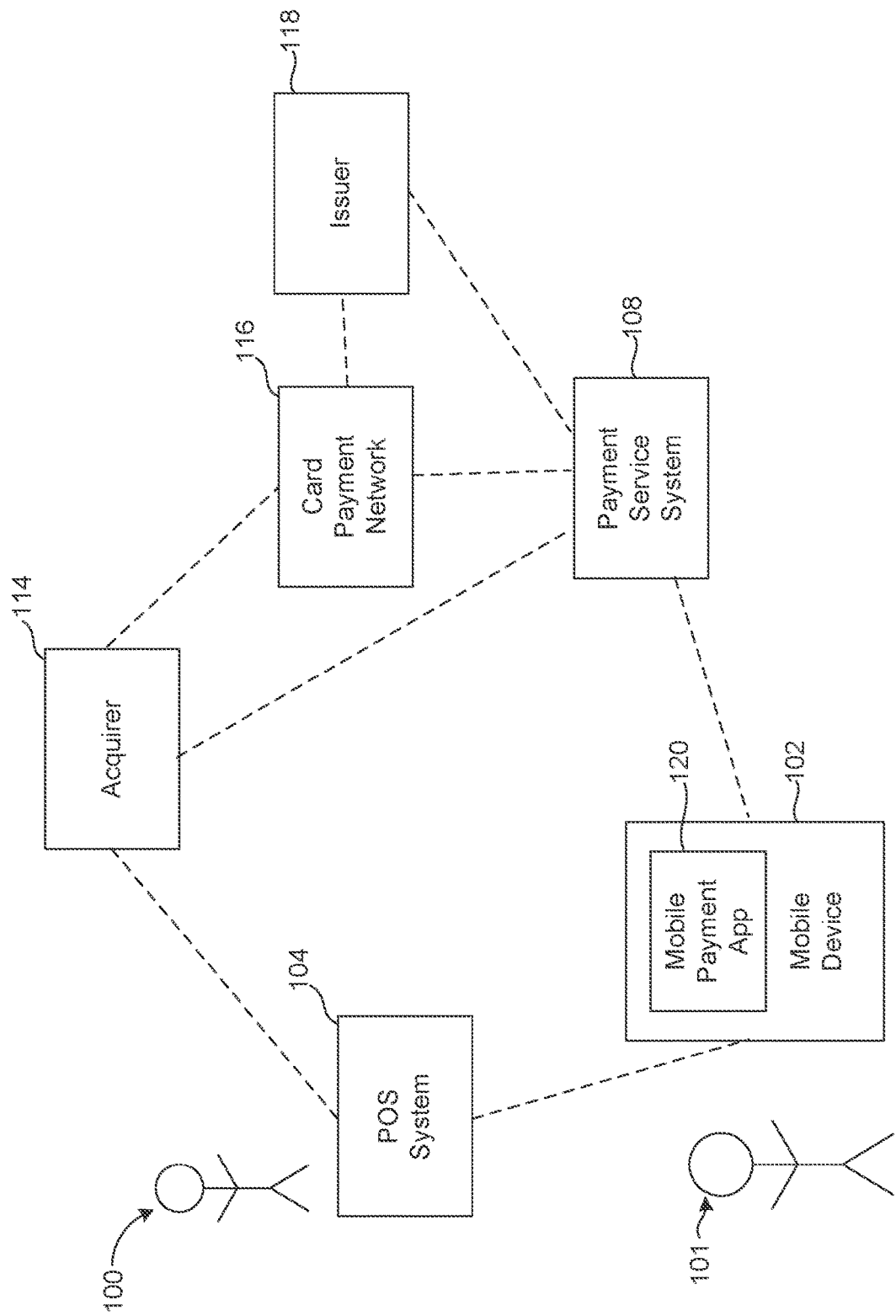
FIG. 2 illustrates an environment in which a payment service system collects transaction information from a card payment network.

FIG. 2 illustrates an environment in which a payment service system collects transaction information from a card payment network. The user 101 can enroll his financial accounts for an interactive payment service through a mobile application running on the mobile device 102. Alternatively, the user 101 can enroll through a website. The user 101 may need to enter additional information for account verification purpose, such as card verification value (CVV), registration address, or even a picture of the payment card.

The mobile device 102 in turn notifies the payment service system 108 about the enrollment. The enrollment message authorizes the payment service system 108 to collect transaction information regarding the payment transactions that relate to the enrolled financial accounts.

The payment service system 108 can include a database for storing the information of the signed-up financial accounts including, e.g., data identifying the signed-up financial accounts, owners of the accounts, etc. The payment service system 108 sends an instruction to the card payment network 116 to cause the card payment network 116 to include the information of the signed-up financial account in a whitelist database. The card payment network 116 (or another entity involved in processing of payment transactions) subsequently uses the whitelist database during processing of a particular payment transaction to determine whether to send transaction information of the particular payment transaction to the payment service system 108.

The user 101 initiates a payment transaction process by swiping a payment card through a card reader of the POS system 104 (as a traditional payment card transaction) or sending data of a financial account to the POS system 104 (as a card-not-present transaction). For example, the user 101 can use the mobile device 102 to place an online order by instructing the mobile device 102 to send the data of the financial account to the POS system 104. The POS system 104 receives the order and determines various information such as the total amount and stock availability. Then the POS system 104 generates a request for a payment transaction and sends the request and data of the financial account to the acquirer 114. The data of the financial account can include, e.g., cardholder's name, card number, expiration date and card verification value (CVV).

The acquirer 114 send the payment authorization request and data of the financial account to the card payment network 116. Based on the received data of the financial account, the card payment network 116 determines the financial institution (issuer) that issued the financial account and distributes the payment authorization request and data of the financial account to the issuer 118. Once the issuer 118 approves the payment transaction on behalf of the user 101, the issuer 118 sends a payment authorization message to the POS system 104 via a path opposite of that described above.

When the card payment network 116 receives the request for the payment transaction, the card payment network 116 immediately determines whether the corresponding financial account is identified in the whitelist database that the card payment network 116 maintains (or to which the payment network 116 has access). If the whitelist database includes that financial account, the card payment network 116 then immediately sends the transaction information to the payment service system 108. Hence, the card payment network 116 makes this determination and, if appropriate, sends this information to the payment service system 108, during the transaction authorization process.

The payment service system 108 can communicate with the card payment network 116 through, e.g., a predetermined application programming interface (API). Through the API, the payment service system 108 receives the transaction information that relates to financial accounts that have been enrolled for the interactive payment service. The transaction information of a transaction can include, e.g., an amount of the payment transaction, an identification of the associated financial account, an identity of the merchant, and item-level information. The item-level information relates to the goods or services involved in the payment transaction. The item-level information can include names, identification numbers, prices, or descriptions of the goods or services. For example, item-level information of a purchase in a coffeehouse can include information such as iced coffee and apple pie (i.e., names), SKU102 and SKU 231 (i.e., stock-keeping unit numbers), $2.99 and $3.49 (i.e., prices).

The payment service system 108 may receive transaction information from systems other than the card payment network 116. For example the acquirer 114 or the issuer 118 can also maintain a whitelist database for financial accounts that have been enrolled for the interactive payment service. Similar to the card payment network 116 as illustrated in FIG. 2, the acquirer 114 or the issuer 118 can update the whitelist database when the payment service system 108 sends an instruction to add a new financial account into the database. When the acquirer 114 or the issuer 118 receives a request for processing a payment transaction that relates to a financial account identified by the whitelist database, the acquirer 114 or the issuer 118 sends the transaction information to the payment service system 108.

In some alternative embodiments, instead of maintaining a whitelist database for identifying financial accounts for the purpose of transaction information collection, the payment card used by the user 101 can include additional data for transaction information collection purpose. Once the payment card swipes through a card reader of the POS system 104, the POS system 104 sends the additional data along with the data of the payment card to the acquirer 114. The acquirer 114, the card payment network 116 or the issuer 118 can follow the instruction included in the additional data to send the transaction information relating to the payment card to the payment service system 108.

Figure 3:
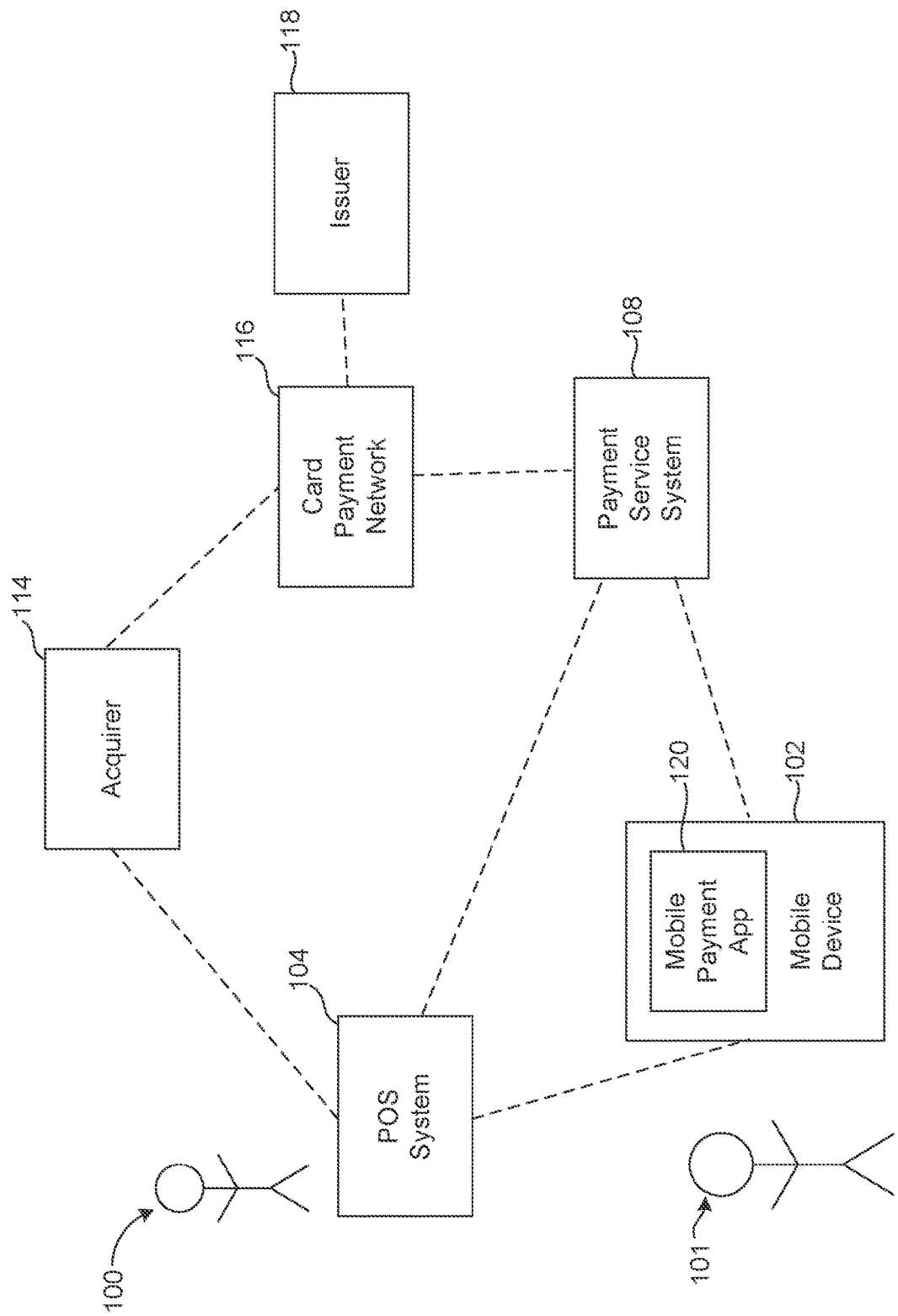
FIG. 3 illustrates an environment in which a payment service system collects transaction information from a point-of-sale system.

Instead of receiving transaction information from the acquirer 114, card payment network 116 and the issuer 118, the payment service system can receive transaction information from the POS system 104. FIG. 3 illustrates an environment in which a payment service system collects transaction information from a point-of-sale (POS) system. The POS system 104 maintains a whitelist database for financial accounts that have been enrolled for the interactive payment service.

The POS system 104 can add to or drop from the whitelist database any financial account, based on the instructions received from the payment service system 108. A user 101 can use the mobile device 102 to send messages to the payment service system 108, indicating that the user 101 wants to enroll a financial account for the interactive payment service (or disassociate the financial account with the interactive payment service).

Once the user 101 swipes a payment card through a card reader of the POS system 104, or sends data of a financial account to the POS system 104 (e.g., via the mobile device 102), the POS system 140 determines the total amount and generates a request for processing the payment transaction. The POS system sends the request to the acquirer 114. The acquirer 114 further sends the request to the card payment network 116, which identifies the issuer 118 based on the data of the financial account. Once the issuer 118 approves the payment transaction, the issuer 118 sends a payment authorization message to the POS system 104 via a path opposite of that described above.

The POS system 104 scans the whitelist database to determine whether the financial account is identified by the whitelist database. If the financial account is identified by the whitelist database, the POS system 104 sends the transaction information to the payment service system 108. The transaction information includes item-level information describing or identifying the goods or services involved in the payment transaction. As an incentive for the POS system 104 of the merchant 100 to supply the transaction information, the merchant 100 may receive a fee discount for processing the payment transaction. In some embodiments, the payment service system 108 can directly confirm the receipt of the transaction information with the card payment network 116 so that the merchant 100 will receive the processing fee discount. Alternatively, the payment service system 108 can send a proof of receiving the transaction information, such as a confirmation code. The POS system 104 forwards the confirmation code to the card payment network 116 to receive the processing fee discount.

The payment service system can establish a communication channel with the POS system 104 through an application programming interview (API). Using the communication channel, the payment service system 108 can further monitor the status of the selected payment transaction in real time. The POS system 104 can grant the payment service system 108 access to any payment transaction relating to financial accounts identified by the whitelist database. Thus, the payment service system 108 not only can receive the transaction information, but also can monitor the status of the payment transaction, including being notified of the payment completion in real time.

Using the received transaction information, the payment service system 108 can provide the interactive payment service to the user 101 in various ways. For example, the payment service system 108 can generate an interactive digital receipt based on the transaction information and send the interactive digital receipt to the mobile device 102 of the user 101. The mobile device 102 can present the interactive digital receipt in different forms, such as a cell phone message, an email, a webpage, a push notification, or a user interface within the mobile payment application 120. The user 101 can interact with the interactive digital receipt for performing various tasks, such as confirming the total amount, adjusting tip amount, entering feedback, applying promotional discount, etc.

The connections between the systems and/or devices in FIGS. 2 and 3 can be either direct or indirect. For example, the connection between the payment service system 108 and the mobile device can be an indirect connection through the internetwork 106 (as illustrated in FIG. 1).

Figure 4A:
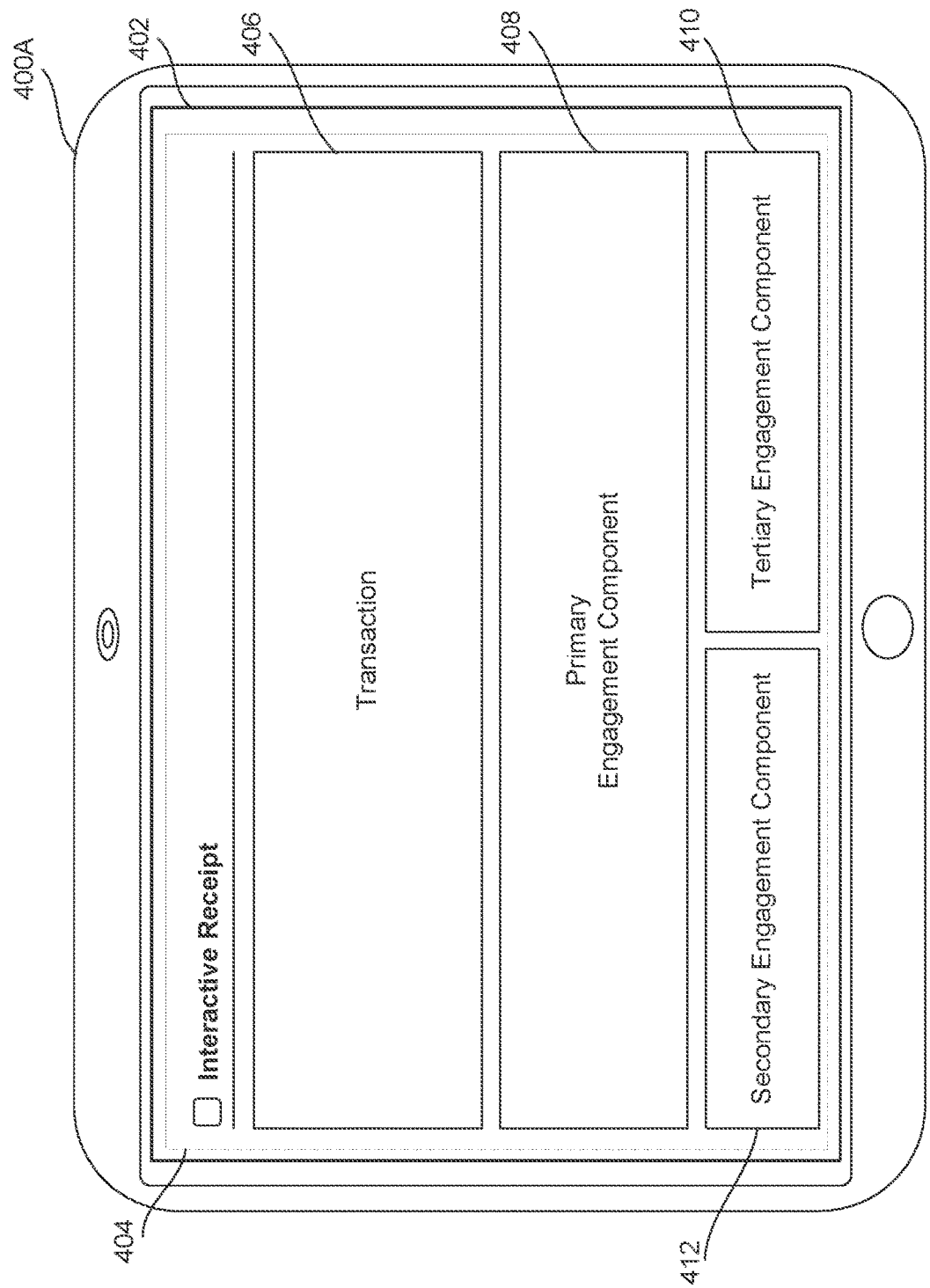
FIG. 4A illustrates a first embodiment of an interactive digital receipt implemented on a mobile device 400A.

FIG. 4A illustrates a first embodiment of an interactive digital receipt implemented on a mobile device 400A. A mobile device can be a smartphone (e.g., iPhone®, Android®-enabled phone, etc.), a personal digital assistant (PDA), a tablet, an e-reader, or other mobile or portable computing devices, a desktop, a laptop, or other wired and wireless personal computers. In the embodiment of FIG. 4A, mobile device 400A is a tablet computer. Mobile device 400A is equipped with a display screen 402 for displaying various user interfaces to enable a user (e.g., customer) to interact with content generated on the mobile device 400A.

Mobile device 400A can implement an application, such as an interactive receipt mobile application for use by a mobile user, where the interactive receipt mobile application includes one or more customer interface components of interactive digital receipt 404. The interactive receipt mobile application can be either the same application as mobile payment application 120 or an application separate from the mobile payment application 120. As used herein, the term "customer interactive component" refers to a component of a user interface intended for a customer to view and interact (e.g., submit inputs) with various features offered via interactive digital receipt 404. Interactive digital receipt 404 includes information indicative of the payment transaction, such as transaction information (e.g., payment amount and item description), and various features that allow the customer to perform action associated with the transaction, subsequent to delivery of the receipt to the customer. While interactive digital receipt 404 is embodied in a mobile application according to the embodiment of FIGS. 4A-4B, other embodiments of the receipt are possible in light of the disclosure herein. In some embodiments, interactive digital receipt 404 is embodied in a text message that can be received at a computing device (e.g., devices 400A, 400B). In some embodiment, interactive digital receipt 404 is embodied in an email message that can be received at the computing device.

In some embodiments, payment service system 108 generates interactive digital receipt 404 for a customer after completion of a payment transaction between the customer and a merchant (e.g., payment authorization and approval that occurs at the completion of a service and/or tendering of goods). Payment service system 108 then delivers receipt 404 to the customer at the customer's mobile device 400A. In some embodiments, the payment service system 108 includes a digital receipt system that carries out the functionalities associated with implementing receipt 404.

The mobile device 400A receives and displays the interactive digital receipt 404 on display screen 402. Interactive digital receipt 404 may take up an entirety or any portion of display screen 402. Interactive digital receipt 404 can include various contents offered to the customer. In the embodiment of FIG. 4A, interactive digital receipt 404 includes a transaction component 406 and one or more interactive components 408, 410, 412. The transaction component 406 displays details associated with a particular transaction between the customer and the merchant, where the transaction details are displayed in real time in response to an occurrence of the particular transaction (e.g., payment transaction at the completion of a service). The interactive components 408, 410, 412 display one or more features for the customer to interact or perform an action associated with the transaction. In some embodiments, the features are generated so as to be available via the interactive digital receipt 404 only within a predefined time period. The predefined time period is configurable by the merchant and allows the merchant to provide time-based incentives to engage the customer.

The interactive components and general look and feel of interactive digital receipt 404 can be configured according to a particular merchant's needs. For example, a merchant in the business of selling household supplies can configure the interactive digital receipt to generate a feedback component without generating a tipping component. In another example, a merchant in the business of operating a restaurant can choose to have both the tipping and the feedback components be generated in the interactive digital receipt 404. One of ordinary skill in the art will appreciate that other configurations and components are possible.

Figure 4B:
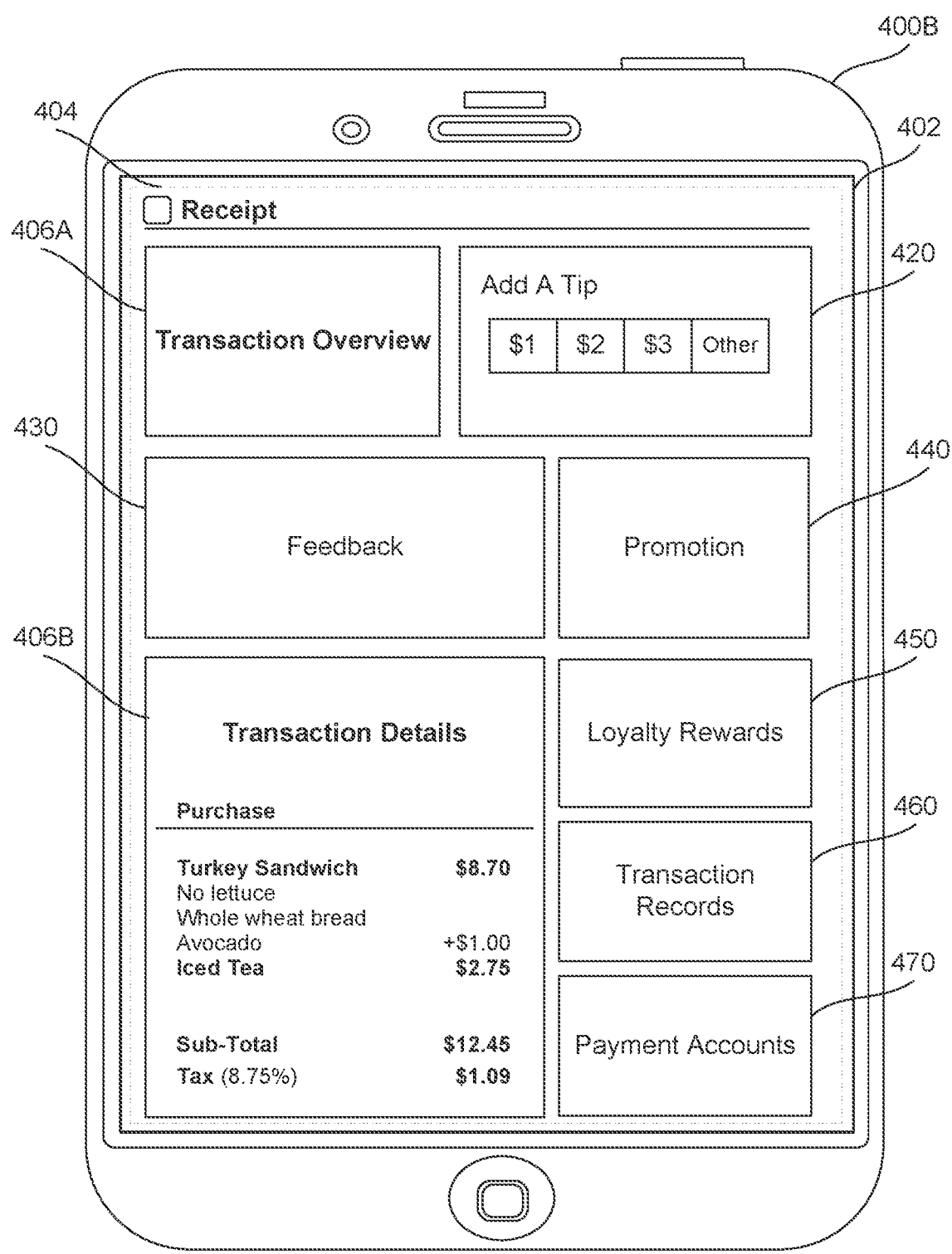
FIG. 4B illustrates a second embodiment of an interactive digital receipt implemented on a mobile device 400B.

FIG. 4B illustrates a second embodiment of an interactive digital receipt implemented on a mobile device 400B. According to the embodiment of FIG. 4B, the mobile device 400B is a smartphone. In FIG. 4B, interactive digital receipt 404 includes transaction components 406A, 406B, an interactive tipping component 420, an interactive feedback component 430, an interactive promotion component 440, an interactive loyalty rewards component 450, an interactive transaction records component 460, and an interactive financial accounts component 470.

Transaction components 406A, 406B provide transaction information associated with the transaction. Transaction component 406A includes an overview of the transaction completed between the customer and the merchant, such as the total amount of the transaction, the payment card used for the transaction (e.g., payment card name or last four digits of a payment card associated with the payment card), and the date, among others. Transaction component 406B includes details of the transaction, such as the name of the items purchased, the quantity, and the price, among others. For example, the transaction component 406B includes item-level information such as turkey sandwich and iced team (i.e., item names), $8.70 and $2.75 (item prices).

Interactive tipping component 420 (or, "tipping component") allows the customer to submit a gratuity ("tip") amount at a later time, i.e., subsequent to completion of a payment transaction. An example transaction, for example, is payment for a meal, where the customer can leave a tip after she has left the restaurant using interactive digital receipt 404 on her mobile device 400B, which has been delivered to device 400B automatically after completion of payment. In some embodiments, payment service system 108 receives the customer's tip submission via interactive receipt 404 and communicates the amount to the card payment network 116. The card payment network 116 adds the tip amount to the already authorized payment amount and sends the updated authorization to POS system 104 of the merchant, without requiring any additional payment approval from the customer. The merchant does not have to physically enter and request for an additional authorization for the tip amount from the card payment network 116.

In some embodiment, tipping component 420 includes automatically generated tip amounts based on a payment amount associated with the transaction (e.g., 10%, 15%, or 20%). In some embodiments, tipping component 420 includes a text box that allows the customer to enter a number. In some embodiments, where interactive digital receipt 404 is in the form of a text message, tipping component 420 is embodied in a text message prompting the customer to reply with an amount (e.g., "Tip by reply with dollar amount"). In some embodiments, tipping component 420 is a Uniform Resource Locator (URL) link which takes the user to a web page to allow adding of the tip amount. The link can be a part of a text message, a part of the text box within a mobile app, or an email.

In some embodiments, tipping component 420 is configured to be available for an unlimited time period. In some embodiments, tipping component 420 is configured to be available for a predefined time period, or timeframe, starting after a time instance when payment has been authorized and approved. The time period may be, for example, an hour, a day, a week, or any other desired time period (e.g., unlimited). In some embodiments, the time period is configured by the merchant. The time period is initialized, or started, at a time instance at which the transaction between the customer and merchant has completed, and decreases incrementally, from this time instance, at a rate that corresponds to an ordinary passage of time. At the expiration of the time period (i.e., the countdown reaches 0), the tipping feature becomes unavailable. In a real-world setting, such time limitation helps the merchant manage its payment transactions more efficiently. For example, a merchant often processes its payment transactions in batches and would not want to keep any particular transaction open indefinitely.

In some embodiments, the time period of the tipping component 420 is configured to incorporate a user defined default tip amount. A customer defines a nominal tip to be automatically submitted if no tip is submitted at the time period expiration. For example, customer defines the default tip to be $10 for her favorite restaurant to make sure that merchant always gets a tip. In such example, the $10 tip is automatically authorized for any transaction with that restaurant whenever no tip amount is added at the expiration. In some embodiments, the default tip amount may be defined by the merchant. For example, a restaurant merchant may want to configure a default nominal amount for restaurant services to groups of six parties or more. In such example, when no tip is added to the payment amount at the end of a time period (e.g., 2 hours), an automatic 20% tip is added to the customer's payment card authorization.

Interactive feedback component 430 (or, "feedback component") allows the customer to submit feedback after the completion of a particular transaction with a merchant. The feedback may include submitting, for example, a rating (e.g., 5 stars), a review, a suggestion, or the like, on various aspects of the transaction (e.g., store cleanliness, service, products, overall visit satisfaction, etc.). In some embodiments, the feedback is submitted directly to the merchant. In some embodiments, a digital receipt system, coupled to transaction computer system, coordinates, communicates, and links with third party services associated with the merchant in implementing the feedback feature. In such embodiments, the digital receipt system transmits the feedback, submitted by the customer via receipt 404, to the third party services. The third party services aggregate the feedback in association with other feedback provided by the merchant. Such third party services may include, for example, Yelp.com, Urban Spoon, YP.com, and the like.

In some embodiments, feedback component 430 is configured to be available only for a predefined time period, or timeframe. In some embodiments, the time period associated with the feedback component 430 ("feedback time period") is configured to be the same as the time period associated with tipping component 420 ("tipping time period"). For example, the time periods for both may be set at one hour and at the expiration of the hour, both the tipping and the feedback features become unavailable. In some embodiments, the feedback time period is configured to be different from the tipping time period. For example, the feedback time period may be set at one week while the tipping time period may be set at one hour.

In some embodiments, the feedback time period is configured differently depending on a particular merchant. For example, merchant A configures the feedback time period to be one day while merchant B configures the time period to be one week. In such example, feedback component becomes unavailable to the customer only on the receipt generated for merchant A, and the feedback component on the receipt generated for merchant B remains active until the end of the week. In some embodiments, a merchant can configure the feedback time period to be tied to an incentive (i.e., "feedback reward") to encourage feedback. For example, the customer is rewarded a "20% Off Coupon" incentive, or feedback reward, if a written review is submitted before expiration of the feedback time period. In another example, if the feedback is submitted within 10 minutes after the completion of the payment transaction, the reward is a 20% Off coupon; on the other hand, if the feedback is submitted within 12 hours, but not exceeding the transaction time period allowed for the feedback (e.g., 24 hours), the reward is a 5% coupon.

Interactive promotion component 440 (or, "promotion component") allows a particular merchant to engage and incentivize a customer to interact with the merchant. In some embodiments, promotion component generates one or more promotional rewards (or, "promotion") associated with the completed transaction. For example, merchant A provides a coupon that can be redeemed at merchant B, an affiliated business with merchant A. In some embodiments, the promotion is time-based, where the customer must redeem the reward within a predefined period, or timeframe. In such embodiments, the promotion is configured to reduce, or decrease in value, corresponding to a decrease in the passage of time associated with the time period. The time period associated with the promotion component 440 ("promotion time period") may be configured to be the same as, or different from, the feedback time period, and/or the tipping time period.

In one example, a "$10 off" coupon is generated via the interactive digital receipt for the customer to redeem at a next meal with the merchant. Such $10 coupon is set to decrease in value (i.e., until $0) from the moment the coupon is generated subsequent to the transaction at the merchant's store. As such, the sooner the customer redeems the time-based coupon, the higher the value she receives. In some embodiments, the merchant configures the rate of reduction. In one example, the restaurant sets the $10 coupon to expire after a week, with no reduction in value as long as the coupon is redeemed. In another example, the restaurant sets the $10 coupon to expire after 3 days, where the value reduces each day until the value reaches $0 at the end of the third day.

In some embodiments, the customer redeems the promotion by completing various redemption, or promotional, activities. Details of the activities may be displayed in the promotion component 440. Some redemption activities include simply revisiting the merchant to make another purchase for goods and/or services, as discussed in the example above. Other redemption activities include participating in a game via the mobile device 400B. Some redemption activities include participating in activities with other affiliated merchants. The redemption activity and the decreasing rate of the time-based reward may be configured by the merchant offering the reward. Such configurations are beneficial as they allow the merchant to customize the promotions according to the merchant's business, such as tailoring to an advertising campaign or a targeted customer demographic.

In some embodiments, promotion component 440 operates as an advertisement component to promote products and/or services. Such advertisement includes, for example, a promotional reward to entice the user to "click-on" or select a particular offering being displayed. In another example, the advertisement includes a plain display with no interaction required from the customer, where the interaction comes from the advertisement content changing to attract the customer's attention. The advertisement content can change based on the completed transaction for which the receipt 404 has been generated. For example, for a coffee purchase transaction, the advertisement includes information about a sustainable coffee alliance organization. The advertisement can also include information about nearby merchants associated with the venue where the completed transaction has taken place. In some embodiments, the interactive advertisement component is coupled to the interactive transaction record, where advertisement content is changed based on details extracted from the interactive transaction record.

Interactive loyalty rewards component 450 (or, "loyalty record component") allows the customer to maintain and manage loyalty points associated with a particular merchant. Some merchants, for example, choose to reward loyal customers with reward points for their purchases and/or services transacted with the merchant. Loyalty record component 450 tracks those purchases and/or services over time, stores and updates reward points associated with the purchases and/or services, and maintains a membership status of the customer in relation to a particular merchant. In some embodiments, the loyalty record component is configured to be time-based, where the component tracks and maintains the loyalty status and/or rewards based on a predefined time period. For example, the loyalty record component upgrades the loyalty status of the consumer every month, where it calculates the transactions completed by the consumer within the month. The time period associated with the loyalty record component 450 ("loyalty time period") may be configured to be the same as, or different from, time periods associated with other interactive components of the interactive receipt.

In an illustrative example, the rewards record tracks the number of baked goods bought from merchant A's bakery and updates the customer to an "elite status" in relation to that bakery when the customer has bought 10 items within 5 days. The elite status is displayed in the loyalty record component 450. The customer can redeem for a reward at the bakery with the loyalty record. In some embodiments, the merchant's POS system can communicate with the loyalty record component 450 without need for the customer to physically show the loyalty record at time of redemption.

Interactive transaction records component 460 ("transaction records component"). Transaction records component 460 includes one or more interactive digital receipts that has resulted from one or more payment transactions carried out by the customer with one or more merchants. In some embodiments, transaction records component 460 is configured to include only interactive digital receipts associated with a particular merchant. In some embodiments, transaction records component 460 is configured to include all interactive digital receipts associated with the customer, including receipts associated with different merchants with whom the customer has transacted. The interactive transaction record allows the customer to organize her interactive digital receipts, to maintain a comprehensive view of all payment transactions, and to perform one or more actions associated with those transactions via respective interactive components of the receipts. Other interactive components not discussed above, but consistent with the techniques discussed throughout, may also be envisioned by one of ordinary skill in the art based on the disclosed technology.

Interactive financial accounts component 470 (or, "financial accounts component") allows the customer to maintain and change financial accounts, or financial accounts, associated with a particular payment transaction in which a payment object (e.g., payment card) is utilized. The financial accounts component allows a customer to review details about the transaction, including the financial accounts that are associated with the consumer's payment object and the particular financial account selected for payment in a particular transaction. In some embodiments, the financial accounts component allows the consumer to change the selected financial account to another financial account associated with the payment object. For example, the consumer, after leaving the merchant's place of business, remembers she has unused credits in a gift card, and accesses the financial accounts component to select the gift card, instead of a VISA credit card, to pay for the transaction. In some embodiments, the financial accounts component 470 is configured to be time-based, where the component enables the consumer to change financial accounts within a predefined time period. For example, the consumer is able to change the selected financial accounts only within one hour after the transaction has been completed (e.g., after authorization and approval). In another example, the consumer is able to change the selected financial accounts within 24 hours after the transaction.

Figure 5A:
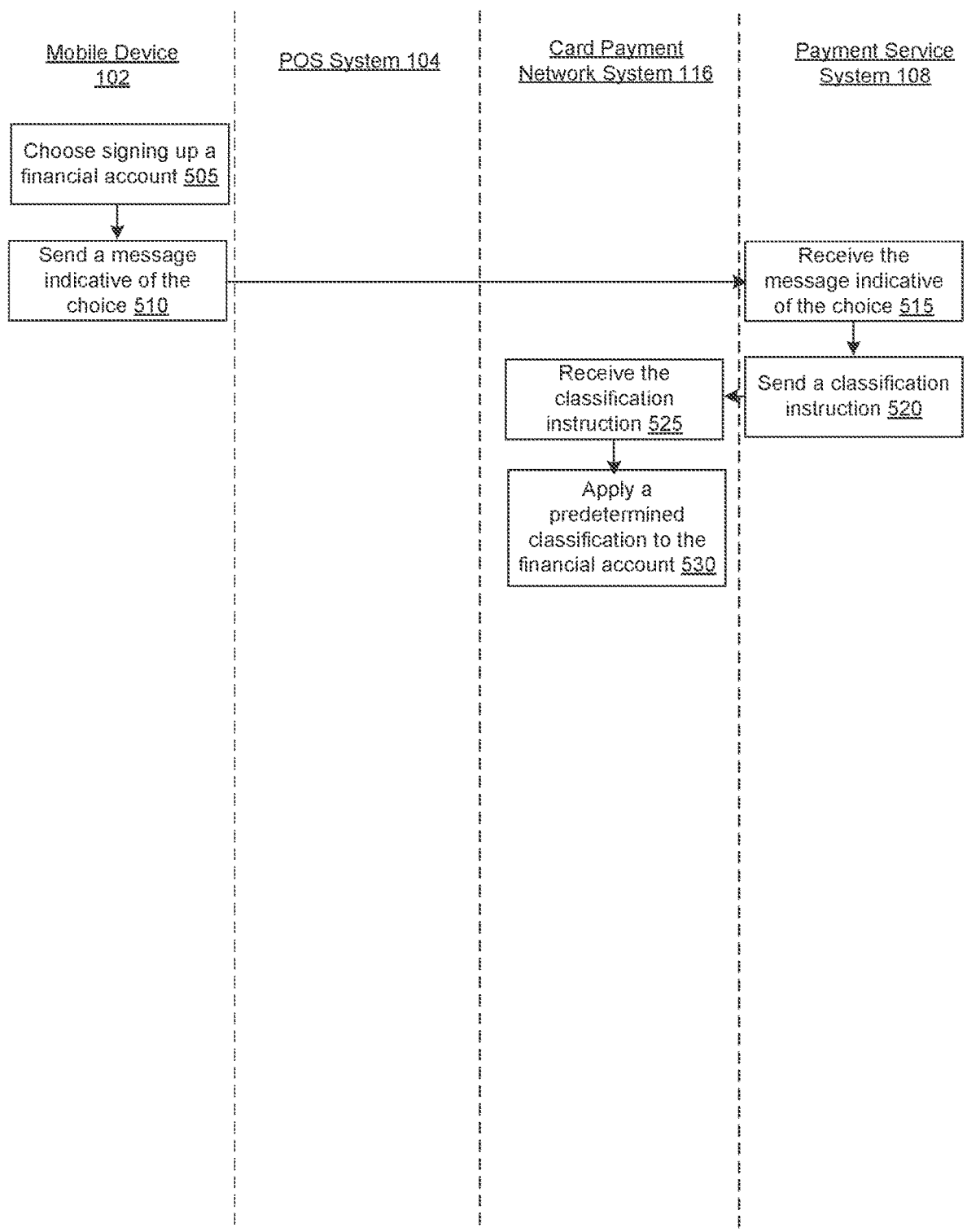
FIG. 5A illustrates an example of a process of classifying financial accounts for transaction information collection.

FIG. 5A illustrates an example of a process of classifying financial accounts for transaction information collection. Initially, a consumer uses a mobile device 102 to choose signing up a financial account of the consumer for an interactive payment service (step 505). The mobile device 102 sends a message to a payment service system 108 indicative of the consumer's choice (step 510).

Upon receiving the message (step 515), the payment service system 108 sends to a card payment network system 116 a classification instruction (step 520). Upon receiving the classification instruction (step 525), the card payment network system 116 applies a predetermined classification to the financial account of the consumer (step 530), i.e., a classification indicative that the account is associated with the payment service system 108. The classification may, but does not necessarily, indicate to the card payment network system 116 that the financial account has been enrolled for the interactive payment service. The classification allows the card payment network system 116 to identify the financial accounts associated with the payment service system 108 so that the card payment network system 116 sends transaction information relating to these financial accounts to the payment service system 108. The card payment network system 116 can, e.g., maintain a database storing information identifying the financial accounts associated with the payment service system 108.

Figure 5B:
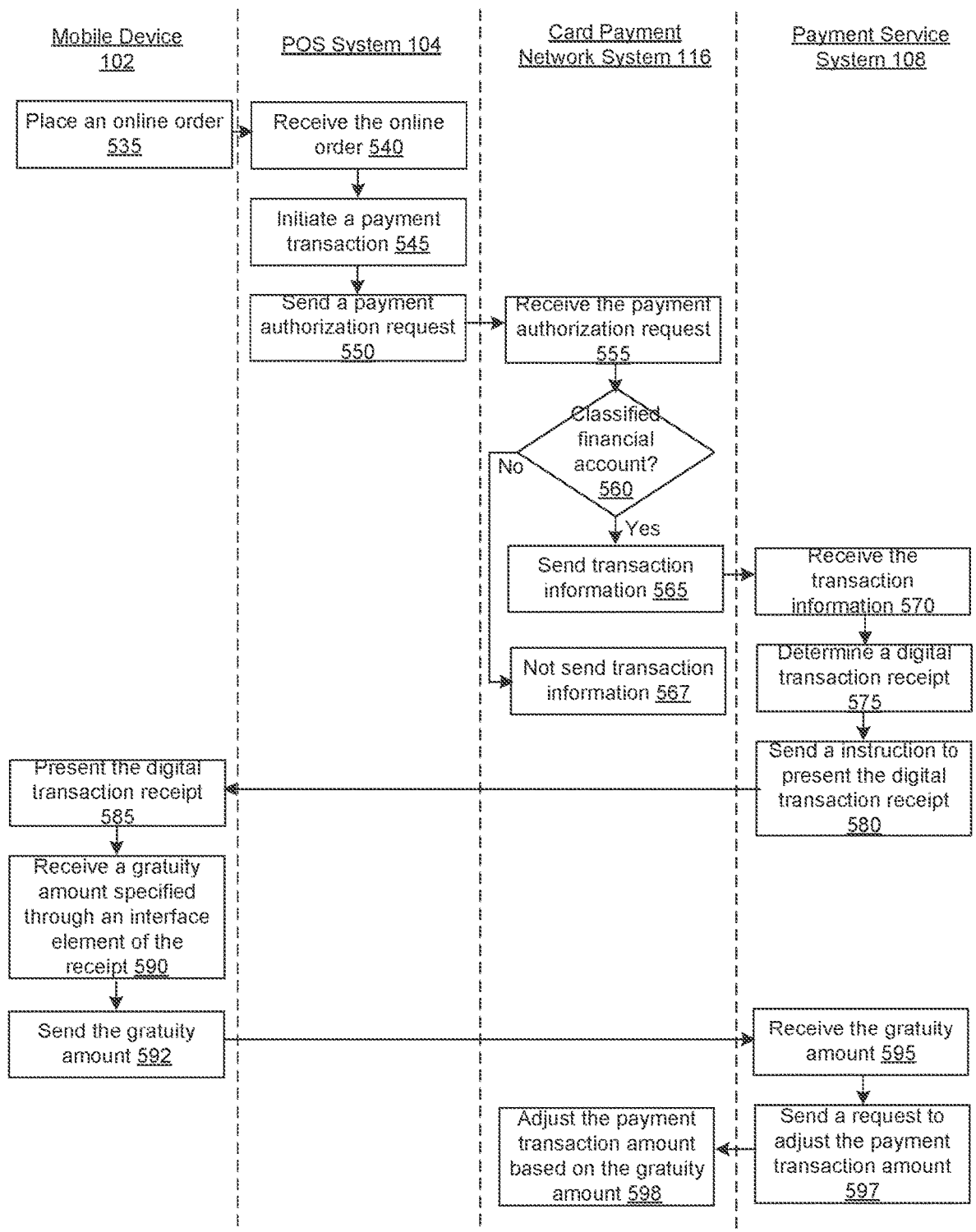
FIG. 5B illustrates an example of a process of collecting transaction information by a payment service system.

FIG. 5B illustrates an example of a process of collecting transaction information by a payment service system. Initially, a consumer instructs his or her mobile device 102 to place an online order (step 535), using, for example, a mobile browser or mobile payment application. Upon receiving the online order from the mobile device 102 (step 540), a merchant server 104 (e.g., the POS system 104 illustrated in FIG. 1) initiates a payment transaction for the online order (step 545). In some alternative embodiments, the merchant server 104 initiates the payment transaction when a payment card swipes through a card reader connected to merchant server 104 or included in the merchant server 104.

The merchant server 104 sends to the card payment network system 116 a payment authorization request for the payment transaction (step 550). Upon receiving the payment authorization request (step 555), the card payment network system 116 determines whether the financial account associated with the payment transaction has been applied with the predetermined classification (step 560). The card payment network system 116 can maintain a database including information of financial accounts that have been applied with the predetermined classification and use the database to determine whether a particular financial account is classified or not.

If that financial account is classified, the card payment network system 116 sends transaction information of the payment transaction to the payment service system 108, through an application programming interface (API) (step 565). If that financial account is not classified, the card payment network system 116 does not send the transaction information to the payment service system 108 (step 567).

The payment service system 108 has access to information of the financial account and information to enable the payment service system 108 to communicate with mobile device 102. The payment service system 108 receives the transaction information from the card payment network system 116 (step 570). Based on the transaction information, the payment service system 108 generates a digital transaction receipt indicative of the payment transaction (step 575). The payment service system 108 then transmits to the mobile device 102 of the consumer an instruction for a mobile application in the mobile device 102 to display (or output in any other manner) the digital transaction receipt to the consumer (step 580). The payment service system 108 is not a participant in processing the payment transaction and is not in a payment transaction message flow between the merchant's POS system 104 and a card issuer or card payment network system 116 involved in the transaction.

The mobile device 102 displays (or otherwise outputs) the digital transaction receipt that lists item-level information relating to goods or services involved in the payment transaction and includes an interface element to enable the consumer to specify a gratuity amount of the payment transaction (step 585). Next, the mobile device 102 inputs the gratuity amount specified by the consumer through the interface element (step 590). The mobile device 102 sends a message indicative of the gratuity amount to the payment service system 108 (step 592).

Upon receiving the message indicative of the gratuity amount (step 595), the payment service system 108 sends to the card payment network system 116 a request to adjust the total payment amount of the payment transaction based on the gratuity amount that has been specified by the consumer (step 597). Accordingly, the card payment network system 116 adjusts the total amount of the payment transaction based on the gratuity amount (step 598). In some alternative embodiments, a consumer or a merchant can specify a gratuity amount using the POS system 104. Likewise the POS system 104 can present a digital receipt and a user interface for specifying the gratuity amount. Upon receiving the specified gratuity amount, the POS system 104 sends the amount to the payment server system 108 to adjust the total payment transaction amount.

In some embodiments, the digital transaction receipt presented by the mobile device 102 includes a user interface element to enable the consumer to specify a promotional code. The payment service system 108 sends a request to the card payment network to confirm the validity of the promotional code and to adjust the amount of the payment transaction based on a promotion associated with the promotional code if the promotional code is valid.

In some other embodiments, the digital transaction receipt presented by the mobile device 102 includes an interface element to enable the consumer to specify a comment that relates to a purchase or a merchant associated with the payment transaction. The digital transaction receipt can further include a link to a website or a mobile application for managing the financial account.

The mobile device 102 can further send the payment service system 108 the location information regarding the geographical location of the mobile device 102 when the mobile device 102 communicates with the POS system and initiates the payment transaction. The payment service system 108 can then forward the location information to the card payment network system 116. Both the payment service system 108 and the card payment network system 116 can utilize the location information to analyze the behavior pattern of the consumer.

In some alternative embodiments, the payment service system 108 receives the transaction information from another payment processing entity involved in the transaction (e.g., an issuer 118, an acquirer 114 or a merchant server), instead of the card payment network system 116. For example the acquirer 114 or the issuer 118 can also maintain a whitelist database for financial accounts that have been applied with a predetermined classification. When the acquirer 114 or the issuer 118 determines that a financial account associated a received payment authorization request has been applied with the predetermined classification, the acquirer 114 or the issuer 118 sends the transaction information to the payment service system 108. The payment processing entity may provide a processing fee discount as an incentive for the merchant server 104 to supply the transaction information.

Figure 6A:
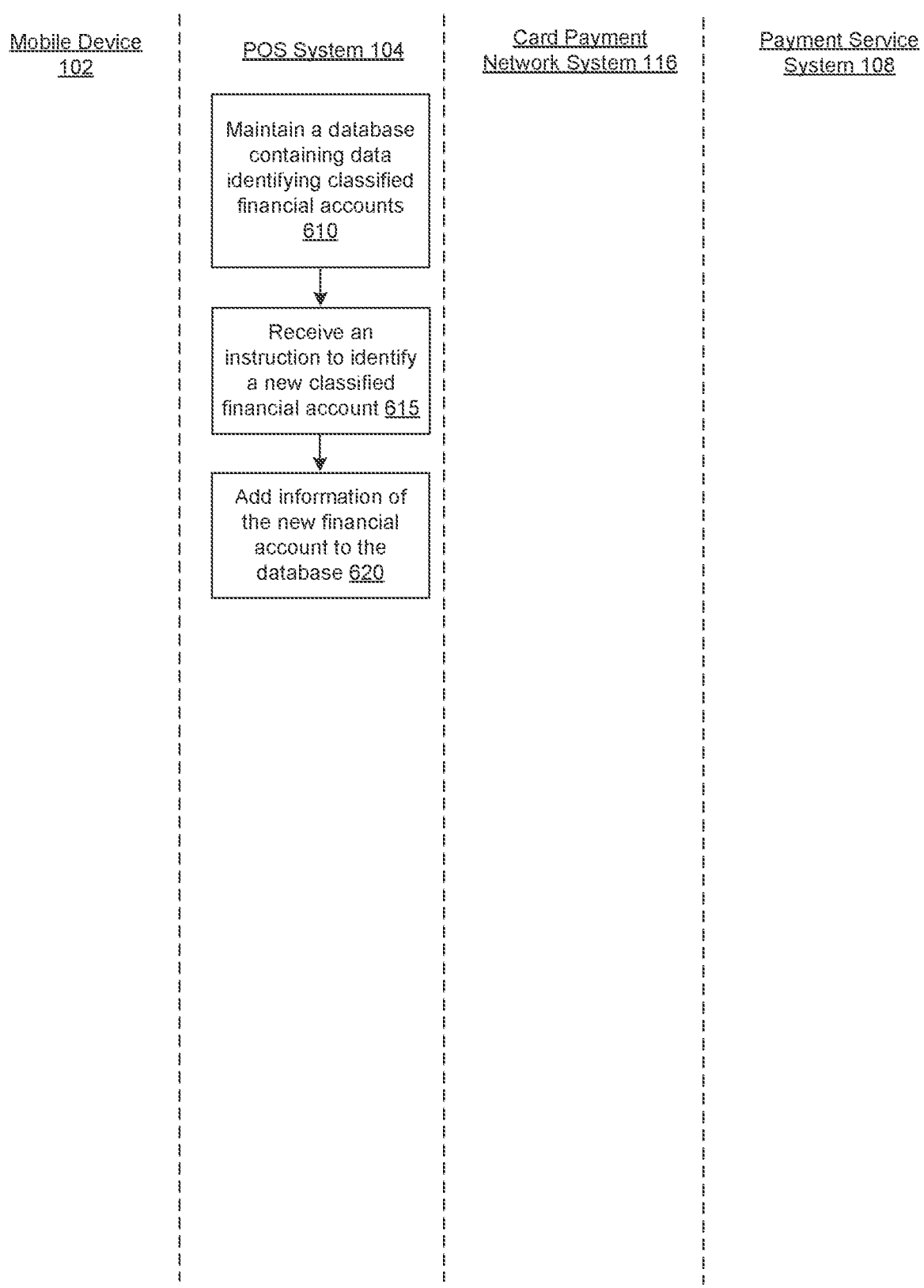
FIG. 6A illustrates an example of a process of classifying financial accounts for transaction information collection in a merchant server.

FIG. 6A illustrates an example of a process of classifying financial accounts for transaction information collection in a merchant server. Initially, the merchant server 104 (e.g., the POS system 104) maintains a database containing data identifying financial accounts being classified with a predetermined classification (step 610). To the merchant server 104, the classification does not necessarily indicate that the financial accounts have been enrolled for an interactive payment service. The classification allows the merchant server 104 to identify the particular financial accounts so that the merchant server 104 sends transaction information relating to these financial accounts to the payment service system 108.

The merchant server 104 receives from a payment service system 108 an instruction to add a new financial account (step 615). Accordingly, the merchant server 104 adds information of the new financial account to the database (step 620).

Figure 6B:
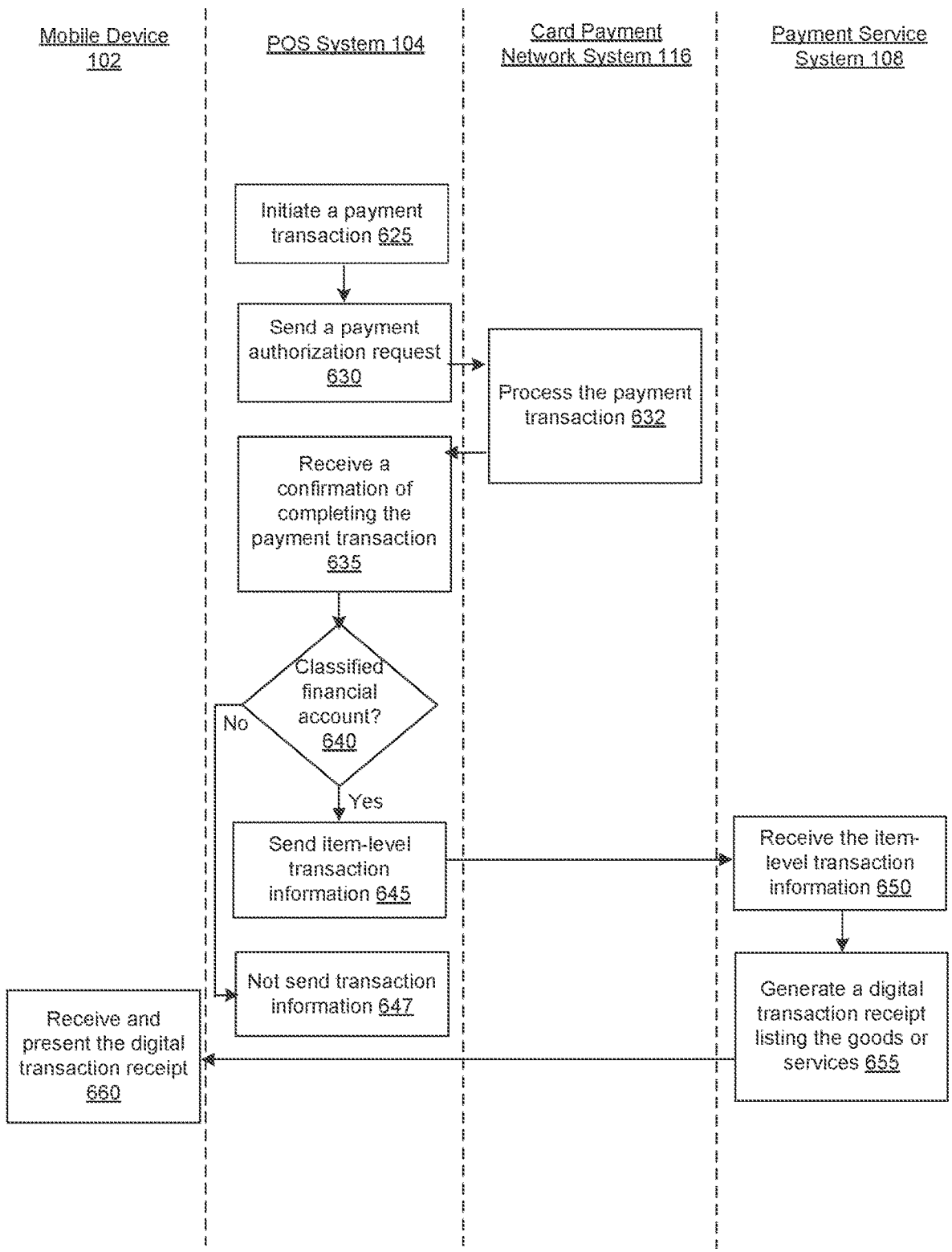
FIG. 6B illustrates an example of a process of supplying item-level transaction information by the merchant server.

FIG. 6B illustrates an example of a process of supplying item-level transaction information by the merchant server 104. The merchant server 104 initiates a payment transaction when a payment card swipes through a card reader connected to merchant server 104 or included in the merchant server 104 (step 625). In some alternative embodiments, the merchant server 104 initiates the payment transaction when the merchant server 104 receives a request for placing an online purchase order from a user device (e.g., mobile device 102). The merchant server 104 sends to a processing server of a payment processing entity (e.g., card payment network system 116) a payment authorization request for the payment transaction (step 630). The payment processing entity can be, e.g., an acquirer, a card payment network or an issuer. The payment processing entity may provide a processing fee discount as an incentive for the merchant server 104 to supply the item-level transaction information.

The payment processing entity processes the payment transaction according to the request (step 632). Then the merchant server 104 receives a confirmation of completing the payment transaction in response to the payment authorization request (step 635).

The merchant server 104 determines whether the financial account involved in the payment transaction is classified as indicated by the data in the database (step 640). If the financial account is classified according to the database, the merchant server 104 sends to the payment service system 108 item-level information about goods or services involved in the payment transaction (step 645). The payment service system 108 has access to information of the financial account and information to enable the payment service system 108 to communicate with mobile device 102. If the financial account is not classified according to the database, the merchant server 104 does not send transaction information to the payment service system 108 (step 647).

Upon receiving the item-level transaction information (step 650), the payment service system 108 generates a digital transaction receipt listing the goods or services involved in the payment transaction based on the item-level information (step 655). A mobile device 102 of the consumer receives and represents the digital transaction receipt (step 660). The digital transaction receipt, as illustrated in FIGS. 4A-4B, enables the consumer to interact with the receipt in various ways, such as specifying tip amount, entering feedback, confirming the transaction, etc. The payment service system 108 is not a participant in processing the payment transaction and is not in a payment transaction message flow between the merchant's POS system 104 and a card issuer or card payment network system 116 involved in the transaction.

Figure 7:
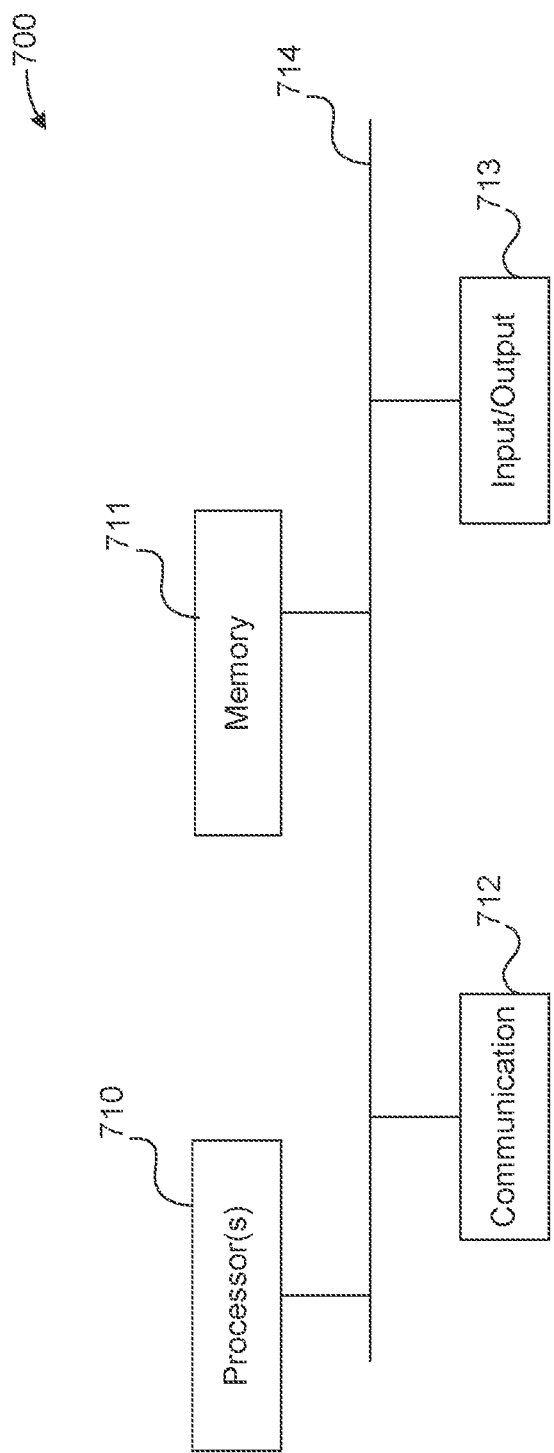
FIG. 7 is a high-level block diagram showing an example of processing system in which at least some operations related to the interactive payment experience technique can be implemented.

FIG. 7 is a high-level block diagram showing an example of a processing device 700 that can represent any of the devices described above, such as the mobile device 102, merchant server 104, acquirer 114, card payment network 116, issuer 118 or payment service system 108.

In the illustrated embodiment, the processing system 700 includes one or more processors 710, memory 711, a communication device 712, and one or more input/output (I/O) devices 713, all coupled to each other through an interconnect 714. The interconnect 714 may be or include one or more conductive traces, buses, point-to-point connections, controllers, adapters and/or other conventional connection devices. The processor(s) 710 may be or include, for example, one or more general-purpose programmable microprocessors, microcontrollers, application specific integrated circuits (ASICs), programmable gate arrays, or the like, or a combination of such devices. The processor(s) 710 control the overall operation of the processing device 700. Memory 711 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 711 may store data and instructions that configure the processor(s) 710 to execute operations in accordance with the techniques described above. The communication device 712 may be or include, for example, an Ethernet adapter, cable modem, Wi-Fi adapter, cellular transceiver, Bluetooth transceiver, or the like, or a combination thereof. Depending on the specific nature and purpose of the processing device 700, the I/O devices 713 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   maintaining, at a first computer system of a merchant, a database identifying financial accounts associated with an interactive payment experience service;
   receiving, from a second computer system of the interactive payment experience service, first data representing an update to the database, the first data indicating that a financial account of a user is associated with the interactive payment experience service;
   receiving, at the first computer system, a first request to initiate a payment transaction associated with the financial account;
   sending, from the first computer system to the second computer system, second data indicating that the payment transaction has been initiated;
   generating transaction information associated with the payment transaction;
   sending the transaction information from the first computer system to a third computer system of a card payment network system, wherein sending the transaction information is part of a payment transaction message flow between the merchant and the card payment network system;
   receiving, at the first computer system, an indication that the payment transaction is authorized;

generating, based at least in part on the financial account being associated with the interactive payment experience and receiving the indication, item-level information about at least one of good or services associated with the payment transaction;

sending the item-level information from the first computer system to the second computer system;

receiving, at the second computer system and from the first computer system, the item-level information;

generating a second request for a digital transaction receipt that indicates the at least one of the goods or the services;

sending the second request from the first computer system to the second computer system;

generating, at the second computer system and based at least in part on receiving the item-level information, the digital transaction receipt; and transmitting, from the second computer system to a mobile device associated with the user, the digital transaction receipt.

2. The method of claim 1, wherein the indication comprises a first indication, and wherein the first request is based at least in part on receiving a second indication that a payment object has been swiped through a card reader associated with the first computer system.

3. The method of claim 1, further comprising receiving, at the first computing device and based at least in part on completing the payment transaction, a process fee discount in exchange for the item-level information.

4. The method of claim 1, further comprising:
receiving, at the first computing system and from the second computer system, a service confirmation code confirming that the merchant has supplied the item-level information;

sending, from the first computing system, the service confirmation code to the card payment network system; and receiving, based at least in part on the service confirmation code, a processing fee discount for the payment transaction.

5. The method of claim 1, wherein the indication comprises a first indication, the digital transaction receipt comprises an interactive interface that enables the user to specify a gratuity amount, the method further comprising:
receiving, at the first computing system and from the mobile device, a second indication of the gratuity amount; and sending, from the first computer system to the second computer system and based at least in part on receiving the second indication, third data representing a request to adjust a total payment amount of the payment transaction.

* * * * *